(12) United States Patent
Yamagami

(10) Patent No.: US 8,838,917 B2
(45) Date of Patent: *Sep. 16, 2014

(54) STORAGE CONTROL SYSTEM AND CONTROL METHOD FOR THE SAME

(71) Applicant: Hitachi, Ltd., Tokyo (JP)

(72) Inventor: Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,769

(22) Filed: Jun. 12, 2013

(65) Prior Publication Data

US 2013/0275675 A1 Oct. 17, 2013

Related U.S. Application Data

(63) Continuation of application No. 12/467,597, filed on May 18, 2009, which is a continuation of application No. 11/976,483, filed on Oct. 25, 2007, now Pat. No. 7,555,601, which is a continuation of application No. 11/448,870, filed on Jun. 8, 2006, now Pat. No. 7,310,702, which is a continuation of application No. 10/834,989, filed on Apr. 30, 2004, now Pat. No. 7,093,068.

(30) Foreign Application Priority Data

Feb. 18, 2004 (JP) .................................. 2004-042048

(51) Int. Cl.
*G06F 12/16* (2006.01)
*G06F 11/14* (2006.01)

(52) U.S. Cl.
CPC ........ *G06F 11/1451* (2013.01); *G06F 11/1458* (2013.01)

USPC ........................................... 711/161; 711/162

(58) Field of Classification Search
CPC .......................... G06F 11/1451; G06F 11/1458
USPC .................................................... 711/161, 162
See application file for complete search history.

(56) References Cited

U.S. PATENT DOCUMENTS

| 4,430,701 A | 2/1984 | Christian et al. .............. 711/119 |
| 5,796,580 A | 8/1998 | Komatsu et al. |

(Continued)

FOREIGN PATENT DOCUMENTS

| JP | 11224164 | 8/1999 |
| JP | 2002-140168 | 5/2002 |

(Continued)

OTHER PUBLICATIONS

Hough, Geoffrey, "3PAR Thin Provisioning", 3PARdata, Inc., Jun. 2003, pp. 1-14.

(Continued)

*Primary Examiner* — Than Nguyen
(74) *Attorney, Agent, or Firm* — Mattingly & Malur, PC

(57) ABSTRACT

A storage control system judges whether the data pattern of data exchanged with a higher-level device (hereafter "data") conforms to one or a plurality of write-excluded data patterns comprised in write-excluded data pattern information prepared in advance. If a negative judgment result is obtained, the storage control subsystem stores the data in a logical device formed on a disk storage device. If, on the other hand, a positive judgment result is obtained, the storage control subsystem erases the data without storing in a logical device.

24 Claims, 21 Drawing Sheets

(56) References Cited

U.S. PATENT DOCUMENTS

| | | | |
|---|---|---|---|
| 5,900,007 A | 5/1999 | Nunnelley et al. | |
| 5,901,327 A | 5/1999 | Ofek | 710/5 |
| 6,092,168 A | 7/2000 | Voigt | |
| 6,631,442 B1 | 10/2003 | Blumenau | |
| 6,665,743 B2 | 12/2003 | Benhase et al. | |
| 6,681,291 B2 | 1/2004 | Ikeuchi et al. | |
| 6,725,328 B2 | 4/2004 | Kano et al. | |
| 6,745,305 B2 | 6/2004 | McDowell | |
| 6,772,283 B2 | 8/2004 | Taroda et al. | 711/112 |
| 6,857,059 B2 | 2/2005 | Karpoff et al. | |
| 6,898,670 B2 | 5/2005 | Nahum | |
| 6,983,353 B2 | 1/2006 | Tamer et al. | 711/163 |
| 7,093,068 B2 | 8/2006 | Yamagami | |
| 7,310,702 B2* | 12/2007 | Yamagami | 711/112 |
| 7,555,601 B2* | 6/2009 | Yamagami | 711/114 |
| 2002/0019908 A1 | 2/2002 | Reuter et al. | |
| 2002/0046322 A1 | 4/2002 | Butterworth et al. | |
| 2002/0073278 A1* | 6/2002 | McDowell | 711/114 |
| 2002/0112113 A1 | 8/2002 | Karpoff et al. | |
| 2002/0129216 A1 | 9/2002 | Collins | |
| 2002/0152143 A1 | 10/2002 | Sanada et al. | |
| 2003/0009619 A1 | 1/2003 | Kano et al. | |
| 2003/0070043 A1 | 4/2003 | Merkey | |
| 2003/0225982 A1 | 12/2003 | Fujita et al. | |
| 2003/0229698 A1 | 12/2003 | Furuhashi et al. | |
| 2004/0030822 A1 | 2/2004 | Rajan et al. | |
| 2004/0054850 A1 | 3/2004 | Fisk | |
| 2004/0078542 A1 | 4/2004 | Fuller et al. | |
| 2004/0215749 A1 | 10/2004 | Tsao | |
| 2004/0215879 A1 | 10/2004 | Matsunami et al. | |
| 2004/0230766 A1 | 11/2004 | Cameron | |
| 2005/0055603 A1 | 3/2005 | Soran et al. | |
| 2006/0101204 A1 | 5/2006 | Bao | |
| 2007/0055713 A1 | 3/2007 | Nagai et al. | |
| 2007/0192560 A1 | 8/2007 | Furuhashi | |
| 2008/0120459 A1 | 5/2008 | Kaneda et al. | |
| 2008/0228990 A1 | 9/2008 | Tomonaga | |
| 2009/0055593 A1 | 2/2009 | Satoyama et al. | |

FOREIGN PATENT DOCUMENTS

| | | |
|---|---|---|
| JP | 2004-013547 | 6/2002 |
| JP | 2003-015915 | 1/2003 |
| WO | 99/32995 | 7/1999 |

OTHER PUBLICATIONS

U.S. Appl. No. 60/209,109, filed Jun. 2, 2000, Reuter et al.
U.S. Appl. No. 60/209,326, filed Jun. 2, 2000, Reuter et al.

* cited by examiner

FIG. 7

LU-LDEV MANAGEMENT TABLE

| PORT NUMBER | TARGET ID | LUN | LDEV# | STORAGE CAPACITY | RAID LEVEL | ADDRESS MANAGEMENT INFORMATION | LDEV ATTRIBUTE | DMT-ID | LDEV POOL NUMBER | STATE | |
|---|---|---|---|---|---|---|---|---|---|---|---|
| #1 | - | - | | | | | | | | | ...... |
| | #1 | - | LDEV#1 | 30GB | 5 | ........ | POOL LDEV | - | #1 | READY | ... |
| | | #002 | LDEV#2 | 100GB | 5 | ........ | POOL LDEV | - | #1 | READY | ... |
| | | ...... | LDEV#1 | 200GB | 5 | ........ | VIRTUAL LDEV | 0 | #1,#2 | READY | ... |
| | #2 | #001 | ...... | ...... | ...... | ...... | ...... | ...... | ...... | ...... | ...... |
| #2 | | ...... | LDEV#1 | 50GB | 1 | ........ | NORMAL LDEV | - | - | NOT READY | ... |
| | | | ...... | ...... | ...... | ...... | ...... | ...... | ...... | ...... | ...... |

FIG. 9

DPT
(DATA PATTERN TABLE)

| PORT #1 TARGET ID 1 LUN #1 | LDEV #0 | 1 | 0x00000000 |
|---|---|---|---|
| PORT #1 TARGET ID 1 LUN #2 | LDEV #1 | 1 | 0xffffffff |
| PORT #1 TARGET ID 1 LUN #3 | LDEV #1 | 1 | 0x12345678 |
| PORT #1 TARGET ID 1 LUN #4 | LDEV #1 | 0 | — |
| ⋮ | ⋮ | ⋮ | ⋮ |

800

STORAGE CONTROL SYSTEM AND CONTROL METHOD FOR THE SAME

CROSS-REFERENCE TO PRIOR APPLICATION

The present application is a continuation of application Ser. No. 12/467,597, filed May 18, 2009 which is a continuation application of U.S. Ser. No. 11/976,483, filed Oct. 25, 2007, which is a continuation of application Ser. No. 11/448,870, filed Jun. 8, 2006 (now U.S. Pat. No. 7,310,702); which is a continuation of application Ser. No. 10/834,989, filed Apr. 30, 2004 (now U.S. Pat. No. 7,093,068), which claims priority from Japanese Patent Application No. 2004-042048, filed Feb. 18, 2004, the entire disclosures of all of the above-identified applications are hereby incorporated by reference.

BACKGROUND OF THE INVENTION

1. Field of the Invention

This invention relates to a storage control system connected to a higher-level device and to a method of control of this system.

2. Description of the Related Art

In for example a storage system for basic operations handling large amounts of data, a host computer (hereafter simply "host") manages data using a separately configured storage control subsystem. This storage control subsystem may for example also be called a storage control system, and is a RAID (Redundant Array of Independent Inexpensive Disks) configured with numerous disk storage devices arranged in an array.

For example, in Japanese Patent Laid-open No. 11-224164, a disk subsystem is disclosed having a reduced logical volume and normal logical volume, which manages cache memory using an LRU method (LRU methods are discussed in the paragraph following the next), and which, by changing the position for addition of LRU data columns for data in the reduced logical volume and the position of data in the normal logical volume, is able to cause data of the reduced logical volume to remain a long time in the cache memory.

However, there exist storage control systems in which, among a plurality of logical storage devices (hereafter abbreviated to "logical devices" or "LDEVs") prepared from one or a plurality of disk storage devices, one storage unit, comprising one or more LDEVs, is provided to the higher-level device as an LU (logical unit). In such a storage control system, for example, an LU pair may be formed in which one LU is a primary LU and another LU is a secondary LU, and un-updated data in the primary LU copied to the secondary LU (that is, a so-called snapshot is created).

For example, the storage capacities of both LUs comprised in the LU pair are the same. Hence if the storage capacity of the primary LU is large, the storage capacity of the secondary LU must also be large. In general in a storage control system, the same storage capacity as the LU size provided to the higher-level device is allocated from disk storage devices. However, in general the storage capacity actually used by a higher-level device is only a small portion of the storage capacity actually allocated, and in some cases most of the secured storage capacity is idle. When formatting an LU, data of size equal to the LU storage capacity is output from the host terminal, and the data is written to the entire LU.

SUMMARY OF THE INVENTION

Hence this invention attains at least one of the following objects.

(1) A storage control system and control method for this system are provided which reduce the idle empty storage area, and which prepare a plurality of types of LU and store data in an LU of a type selected from the plurality of types of LU.

(2) A storage control system and control method for this system are provided which reduce the consumption of LDEV storage capacity.

Other objects of this invention will become clear from the following explanations.

According to the perspective of this invention, a storage control system has a plurality of channel adapters that are connected to a higher-level device and that receive data from the higher-level device; one or a plurality of memory portions that are connected to the plurality of channel adapters and that save data exchanged with the higher-level device and control information related to this data; a plurality of disk adapters that are connected to the memory portions and that control so as to write the above data to the above memory portions or to read from the above memory portions; and a plurality of disk drives that are connected to the above plurality of disk adapters and that store the above data under the control of the above plurality of disk adapters. A first channel adapter comprised in the plurality of channel adapters provides to the above higher-level device a plurality of first logical volumes generated based on the storage area of a plurality of first disk drives comprised in the above plurality of disk drives, and when there is write access by the above higher-level device to write the above data to a first logical volume selected from among the above plurality of first logical volumes, the first channel adapter writes the data to an area secured in advance in the above memory portions. A second channel adapter comprised in the above plurality of channel adapters manages together a plurality of second logical volumes generated based on the storage area of a plurality of second disk drives comprised in the above plurality of disk drives, and when information relating to a third logical volume provided to the above higher-level device is received from the higher-level device, if there has been write access from the above higher-level device to write the data to the above third logical volume, an area is secured in the above memory portions according to the above data as a second logical volume corresponding to the above third logical volume, the above data is written to this secured area, and the second logical volume corresponding to the above third logical volume is released.

In a first aspect of this storage control system, at least one memory portion among the above one or a plurality of memory portions stores one or a plurality of write-excluded data patterns, which are data patterns for data excluded from writing which must not exist on the above second logical volume. At least one among the above second channel adapter and the above plurality of disk adapters compare data patterns to determine whether or not the data pattern of the above data conforms to at least one among the above one or a plurality of write-excluded data patterns stored in the above memory portion, and if the result of the comparison is positive, discard the above data.

A second aspect of this storage control system is the above first aspect, in which the above write-excluded data patterns are format data patterns when the above data is received from the above higher-level device in block units, which are the data storage units of the above second logical volume.

A third aspect of this storage control system is the above first aspect, in which at least one among the above second channel adapter and the above plurality of disk adapters comprise a processor and a data check portion having a register. The data check circuit portion performs data pattern comparisons of whether or not the data pattern of the above data conforms to at least one among the above one or a plurality of write-excluded data patterns stored in the above memory portions, and writes the result of the comparison in the above register. The above processor acquires the result of the above data pattern comparison from the above register, and if the result of the data pattern comparison is positive, discards the above data.

In a fourth aspect of this storage control system, the storage control system further comprises a maintenance terminal for forming a plurality of logical paths connecting the above first logical volumes and the above third logical volumes to the above higher-level device.

In a fifth aspect of this storage control system, when the above write access occurs, at least one among the above second channel adapter and the above plurality of disk adapters associate a third logical storage area in the above third logical volume and a second logical storage area in the above second logical volume, and when the result of the above data pattern comparison is positive, cancels the above association and performs the above releasing.

In a sixth aspect of this storage control system, at least one among the above second channel adapter and the above plurality of disk adapters, upon acquiring the above data read from the above third logical volume via the above second logical volume, performs a data pattern comparison to determine whether the data pattern of the above data conforms to at least one among the above one or a plurality of write-excluded data patterns stored in the above memory portion, and if the result of the comparison is positive, erases the above data existing in the above second logical volume.

A seventh aspect of this storage control system is the above sixth aspect, in which the above second logical volume comprises a plurality of logical chunks. When, upon the above write access, the result of the above data pattern comparison for the above data is positive, at least one among the above plurality of disk adapters stores the data in the above second logical volume if the data size of the data is smaller than the storage capacity of the above logical chunks, and when reading data, reads the data in units of the above logical chunks; when a positive data comparison result is obtained for the read data, the read data is deleted from the above logical chunks.

In an eighth aspect of this storage control system, when the above data is written to the first logical storage area of the above first logical volume, at least one among the above second channel adapter and the above plurality of disk adapters reads the data in the first logical storage area and copies the data to the second logical storage area of the above second logical volume (for example, forms a snapshot of the data in the first storage area), and performs a data pattern comparison to determine whether or not the data pattern of the above read data conforms to at least one among the above one or a plurality of write-excluded data patterns stored in the above memory portion, and if the comparison result is positive, discards the data so that the above read data does not exist in the above second logical storage area.

In a ninth aspect of this storage control system, at least one memory portion among the above one or a plurality of memory portions stores one or a plurality of write-excluded data patterns, which are data patterns of write-excluded data which must not exist on the above second logical volume. The above second channel adapter associates a third logical storage area in the above third logical volume with a second logical storage area in the above second logical volume, and when read access from the above higher-level device is access of the third logical storage area not associated with the above second logical storage area, at least one among the above one or a plurality of write-excluded data patterns is transmitted to the above higher-level device.

In a tenth aspect of this storage control system, at least one memory portion among the above one or a plurality of memory portions stores attributes of the above first and third logical volumes. The above second channel adapter reads from the above memory portion the attributes of the above first and third logical volumes, and notifies the above higher-level device of these attributes.

A storage control system according to another perspective of this invention is a storage control system connected to a higher-level device, and comprising a physical storage device, a plurality of logical storage devices, a virtual storage device, one or a plurality of memory portions, and a storage control portion. The physical storage device physically stores data exchanged between the higher-level device and the storage control system. Each of the plurality of logical storage devices is a device not provided to the higher-level device, is provided on the physical storage device, and logically stores the above physically stored data. The virtual storage device is a device provided to the higher-level device, and has a virtual storage area which is dynamically associated with the logical storage area of the logical storage device. The one or a plurality of memory portions store one or a plurality of write-excluded data patterns, which are data patterns of write-excluded data which must not exist on the logical storage device. The storage control portion, upon receiving a read request or write request from the higher-level device, which is aware of the virtual storage unit, associates a virtual storage area in the virtual storage unit with a logical storage area in the logical storage device, and exchanges data between the logical storage area and the higher-level device via the virtual storage area. Also, the storage control portion performs a comparison of data patterns to determine whether or not the data pattern of the data conforms to at least one among the one or a plurality of write-excluded data patterns stored in the above memory portions, and if a positive data pattern comparison result is obtained, erases the data so that it does not exist in the logical storage device.

When a storage control system connected to a higher-level device has a plurality of channel adapters connected to the above higher-level device which receive data from the higher-level device, one or a plurality of memory portions connected to the plurality of channel adapters which save data exchanged with the higher-level device and control information relating to this data, a plurality of disk adapters connected to the above memory portions which control writing of the above data to the above memory portions and control reading from the memory portions, and a plurality of disk drives connected to the plurality of disk adapters which store the above data under the control of the plurality of disk adapters, then a method of this invention is a method of control of the above storage control system, which comprises steps of: providing to the above higher-level device a plurality of first logical volumes generated based on the storage areas of a plurality of first disk drives comprised in the above plurality of disk drives; writing the above data to an area secured in advance in the above memory portions when there is access from the higher-level device to write the above data to a first logical volume selected from the plurality of first logical volumes; managing together a plurality of second logical volumes generated based on storage areas of a plurality of second disk drives comprised in the above plurality of disk drives; and, when information relating to a third logical volume provided to the higher-level device is received from the higher-level device, if there has been access to write the above data from the higher-level device to the above third logical volume, securing in the above memory portions an area corresponding to the above data necessary as the second logical volume corresponding to the above third logical volume, writing the above data to this secured area, and releasing the second logical volume corresponding to the above third logical volume.

In a first aspect of this control method, the control method further comprises steps of: storing, in at least one memory portion among the above one or a plurality of memory portions, one or a plurality of write-excluded data patterns which are data patterns of write-excluded data which must not exist on the above second logical volume; performing a data pattern comparison to determine whether the data pattern of the above data conforms to at least one among the above one or a plurality of write-excluded data patterns stored in the above memory portion; and, if the result of the comparison is positive, discarding the above data. The above write-excluded data pattern is for example a format data pattern when the above data is received from the higher-level device in block units, which are data storage units on the above second logical volume.

In a second aspect of this control method, the control method further comprises a step of forming a plurality of logical paths connecting the above first logical volumes and the above third logical volumes to the above higher-level device.

In a third aspect of this control method, the control method further comprises steps of: when there is the above write access, associating a third logical storage area in the above third logical volume with a second logical storage area in the above second logical volume; and, when the above data pattern comparison result is positive, canceling the above association and of performing the above releasing of the second logical volume.

In a fourth aspect of this control method, the control method further comprises steps of: when the above data read from the above third logical volume via the above second logical volume is acquired, performing a data pattern comparison to determine whether the data pattern of the above data conforms to at least one among the above one or a plurality of write-excluded data patterns stored in the above memory portion; and, when the result of this comparison is positive, erasing the above data existing in the above second logical volume.

In a fifth aspect of this control method, the control method further comprises steps of: when the above data is written to a first logical storage area of the above first logical volume, reading the data in the first logical storage area and copying the data to a second logical storage area of the above second logical volume; performing a data pattern comparison to determine whether the data pattern of the above read data conforms to at least one among the above one or a plurality of write-excluded data patterns stored in the above memory portions; and, if the result of the comparison is positive, discarding the above read data so that the data does not exist in the above second logical storage area.

In a sixth aspect of this control method, the control method further comprises steps of: storing, in at least one memory portion among the above one or a plurality of memory portions, one or a plurality of write-excluded data patterns which are data patterns for write-excluded data which must not exist in the above second logical volume; associating a third logical storage area in the above third logical volume with a second logical storage area in the above second logical volume; and, when read access from the higher-level device is access of a third logical storage area not associated with the above second logical storage area, transmitting to the higher-level device at least one among the above one or a plurality of write-excluded data patterns.

In a seventh aspect of this control method, the control method further comprises steps of: storing, in at least one memory portion among the above one or a plurality of memory portions, attributes of the above first and third logical volumes; and reading from the above memory portion attributes of the above first and third logical volumes and notifying the higher-level device of the attributes.

BRIEF DESCRIPTION OF THE DRAWINGS

FIG. 7 shows an example of the configuration of an LU-LDEV management table 162b of this aspect;

FIG. 9 shows an example of the configuration of a DPT 800;

DESCRIPTION OF THE PREFERRED EMBODIMENTS

Figure 1:
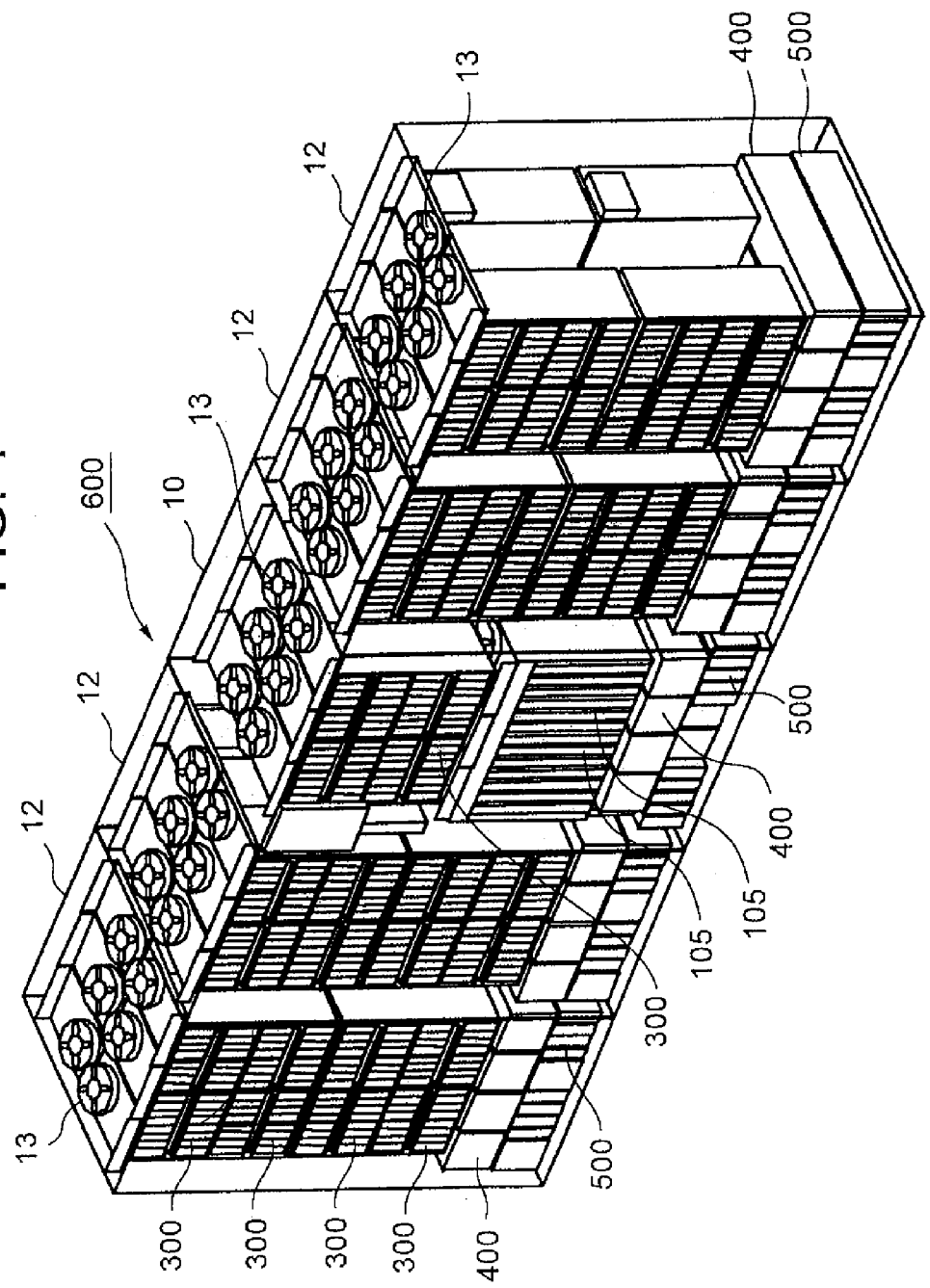
FIG. 1 shows in summary an external view of a storage control system of a first aspect of this invention.

Below, an aspect of this invention is explained, referring to the drawings.

First, one concept of this aspect is briefly explained.

A storage control system of this aspect judges whether the data pattern of data exchanged for example with a higher-level device (hereafter "data") conforms to any of one or a plurality of write-excluded data patterns comprised in write-excluded data pattern information prepared in advance. If a negative judgment result is obtained, the storage control subsystem stores the data in a logical device formed on a disk storage device. On the other hand, if a positive judgment result is obtained, the storage control subsystem erases the data and does not store the data in the LU.

Below, this aspect is explained in detail.

FIG. 1 shows in summary an external view of a storage control system of the first aspect of this invention.

The storage control system 600 can be configured from, for example, a basic housing 10 and a plurality of expansion housings 12 (configuration from only basic housings 11 is also possible).

The basic housing 10 is the smallest component unit of the storage control system 600. In this basic housing 10 are provided, for example, a plurality of disk storage devices (for example, hard disk drives (HDDs)) 300, a plurality of control packages (for example, channel control portions and disk control portions, described below) 105, a plurality of power supply units 400, and a plurality of battery units 500, each capable of attachment and detachment. Also provided in the basic housing 10 are a plurality of cooling fans 13.

Each of the expansion housings 12 is an option of the storage control system 600, and for example a maximum of four expansion housings 12 can be connected to one basic housing 10. In each of the expansion housings 12 are provided a plurality of cooling fans 13. Also provided in each expansion housing 12 are a plurality of disk storage devices 300, a plurality of power supply units 400, and a plurality of battery units 500, each capable of attachment and detachment. Each of these is controlled by control functions of a control package 105 provided in the basic housing 10.

Figure 2:
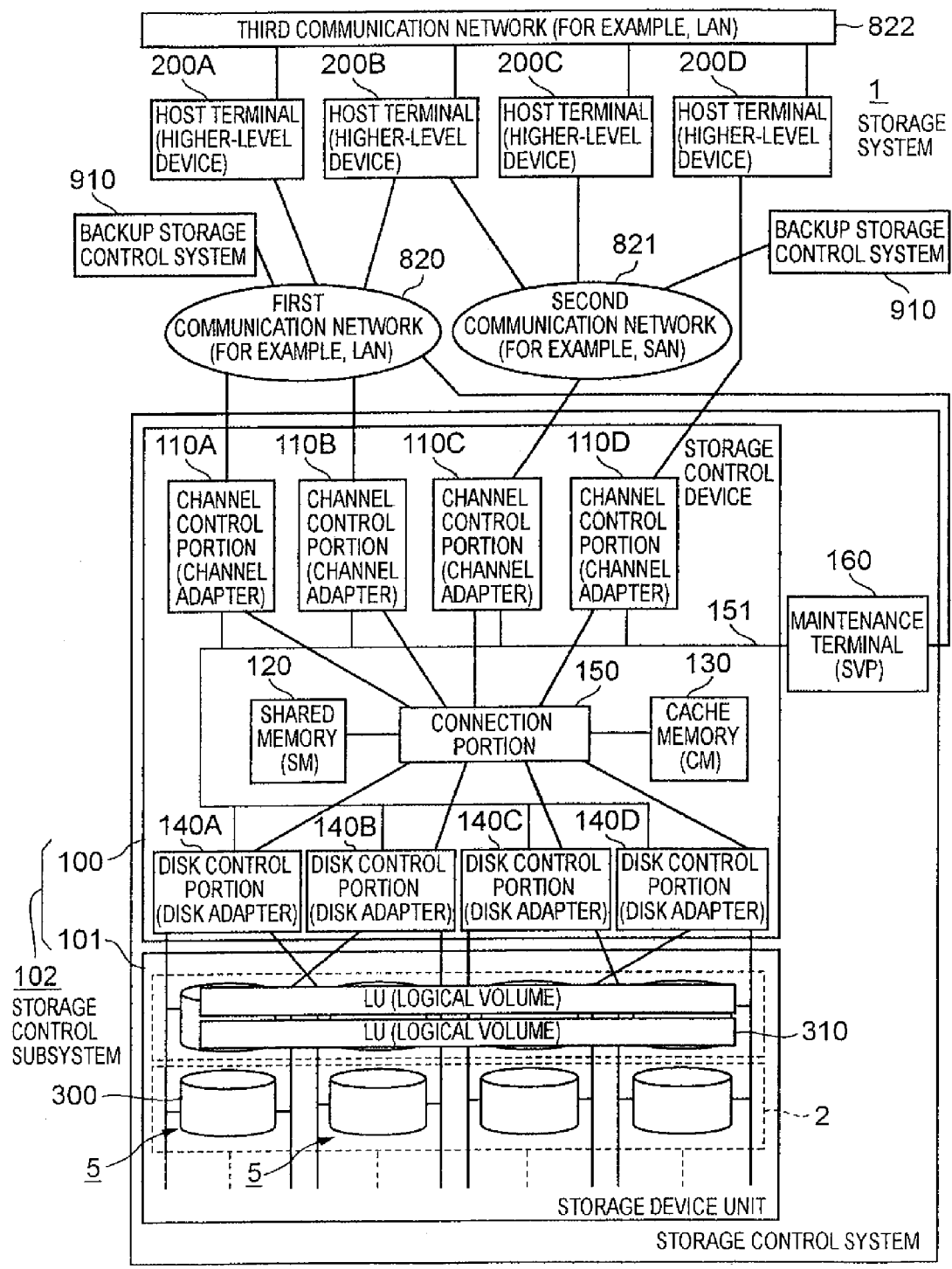
FIG. 2 shows an example of the overall configuration of a storage system of the first aspect of this invention.

FIG. 2 shows an example of the overall configuration of a storage system of the first aspect of this invention.

The basic components of this storage system 1 are one or a plurality of host terminals 200A to 200D, and the storage control system 600.

Each of the host terminals (higher-level devices) 200A to 200D is a computer system (for example, a personal computer or workstation) comprising as hardware resources, for example, a CPU (Central Processing Unit), non-volatile and/or volatile memory (for example, ROM or RAM), and a hard disk or similar. The CPU of each host terminal 200A to 200D, by reading and executing various computer programs stored in a memory portion, performs processing to realize various functions, with the computer program and hardware resources (for example, memory) operating in concert. Each of the host terminals 200A to 200D can be connected by various methods to the storage control system 600.

For example, the host terminals 200A and 200B are connected to the storage control system 600 via a first communication network (for example, a LAN, the Internet, or a leased line; hereafter a LAN is assumed) 820. Communications between the host terminals 200A and 200B and the storage control system 600 via the LAN 820 are performed, for example, according to the TCP/IP protocol. Data access requests through specification of filenames (data input/output requests in file units; hereafter called "file access requests") are transmitted to the storage control system 600 from the host terminals 200A and 200B.

Further, the host terminals 200B and 200C for example are connected via a second communication network (for example, a SAN (Storage Area Network); hereafter a SAN is assumed) 821 to the storage control system 600. Communication between the host terminals 200B and 200C and the storage control system 600 via the SAN 821 are for example performed according to a fiber channel protocol. Data access requests in for example block units (hereafter called "block access requests") are transmitted from the host terminals 200B and 200C to the storage control system 600 (here a block unit is a unit of data management in storage areas on disk storage devices 300, described below).

Further, the host terminal 200D is for example connected directly to the storage control system 600, without the LAN 820 or SAN 821 or other networks intervening. The host terminal 200D can for example be a mainframe computer. Communications between the host terminal 200D and storage control system 600 are performed according to, for example, the FICON (Fibre Connection, a registered trademark), ESCON (Enterprise System Connection, a registered trademark), ACONARC (Advanced Connection Architecture, a registered trademark), FIBARC (Fibre Connection Architecture, a registered trademark), or other communication protocol. Block access requests are transmitted from the host terminal 200D to the storage control system 600 conforming, for example, to one of these communication protocols.

At least one among the LAN 820 and SAN 821 is connected to, for example, a backup storage control system 910. The backup storage control system 910 may be a storage control system which stores data in a disk system device selected from among one or a plurality of disk system devices (for example, MO, CD-R, or DVD-RAM), or may be a storage control system such as the storage control system 600 described in detail below, or may be a storage control system which stores data in a tape system device selected from among one or a plurality of tape system devices (for example DAT tape, cassette tape, open tape, or cartridge tape). The backup storage control system 910 receives data stored in the storage control system 600 via for example the LAN 820 or SAN 821 (or, from a host terminal connected to the backup storage control system 910), and stores this data in a storage device (for example, a tape system device) comprised in the backup storage control system 910 itself.

Further, a management server 819 for example may be connected to at least the LAN 820 among the LAN 820 and SAN 821. The management server 819 may perform relay of communications between for example a host terminal and another host terminal, or between a host terminal and the storage control system 600.

Further, the host terminals 200A to 200D may also be mutually connected through a third communication network (for example, a LAN).

The storage control system 600 is for example a RAID (Redundant Array of Independent Inexpensive Disks) system. The storage control system 600 controls according to commands received from the host terminals 200A to 200D. The storage control system 600 comprises a storage control subsystem (disk array device) 102, and a maintenance terminal (hereafter called a "SVP", an abbreviation for "Service Processor") 160. The storage control subsystem 102 comprises a storage control device 100 and storage device unit 101. The storage control device 100 comprises one or a plurality of channel control portions 110A to 110D; one or a plurality of cache memory portions (hereafter abbreviated to "CM") 130; one or a plurality of shared memory portions (hereafter abbreviated to "SM") 120; one or a plurality of disk control portions 140A to 140D; and a connection portion 150. The storage device unit 101 comprises one or more physical device groups 5. Each of the one or more physical device groups 5 has a plurality of disk storage devices 300 arranged in an array.

Each of the channel control portions 110A to 110D can be configured from hardware circuitry, software, or a combination thereof. Each of the channel control portions 110A to 110D can be attached to and removed from the storage control device 100 (for example, the basic housing 10), and may be called a channel adapter. Each channel control portion 110A to 110D comprises, for example, a printed board on which are mounted a processor, memory and similar, and a control program stored in the memory portion; prescribed functions are realized through the concerted operation of this hardware and software. Each of the channel control portions 110A to 110D is multiply redundant (for example, dual-redundant), so that even if one channel control portion fails, another channel control portion continues to operate. The channel control portions 110A to 110D execute processing according to commands received from a host terminal, while referencing control information and similar (for example, an LU-LDEV management table, described below) within the SM 120. Of the channel control portions 110A to 110D, taking the channel control portion 110C as an example for explanation including operation of the disk control portions 140A to 140D, when for example the channel control portion 110C receives an I/O request (an input/output request, in this case a block access request) comprising a read request from a host terminal 200A or 200B, the read command is stored in the SM 120, and a cache area is secured in the CM 130. The disk control portions 140A to 140D reference the SM 120 as necessary and, upon discovering an unprocessed read command, read the data from the disk storage device 300 (typically, user data exchanged between the host terminals 200A to 200D and the disk storage device 300), and stores the data in the cache area secured in the CM 130. The channel control portion 110C reads the data transferred to the CM 130 from the cache area, and transmits the data to the host terminal 200A or 200B which had issued the read request.

When for example the channel control portion 110C receives an I/O request comprising a write request from the host terminal 200B or host terminal 200C, the write command is stored in the SM 120, a cache area is secured in the CM 130, and data comprised in the received I/O request is stored in the above secured cache area. Then, the channel control portion 110C reports the completion of writing to the host terminal 200B or 200C from which the write request was issued. The disk control portions 140A to 140D reference the SM 120 as necessary, and upon discovering an unprocessed write command, read data from the above cache area secured in the CM 130 according to the write command, and store the data in the prescribed disk storage device 300.

The above processing can also be performed by the other channel control portions 110A, 1108, and 110D. The channel control portions 110A and 1108 perform the above processing after converting the file access request into a block access request (for example, after converting the filename contained in the file request into a logical block address, according to the file system of the channel control portion itself).

The disk control portions 140A to 140D can be configured from hardware circuitry, software, or a combination thereof. Each disk control portion 140A to 140D can be attached to and detached from the storage control device 100 (for example, a basic housing 10 or an expansion housing 12), and may be called a disk adapter. The disk control portions 140A to 140D comprise, for example, a printed board on which is mounted a processor, memory and similar, and a control program stored in the memory portion; prescribed functions are realized through the concerted operation of this hardware and software. Each of the disk control portions 140A to 140D is multiply redundant (for example, dual-redundant), so that even if one disk control portion fails, another disk control portion continues to operate. The disk control portions 140A to 140D reference control information and similar in the SM 120 (for example, the LU-LDEV management table, described below) while controlling data communications with each of the disk storage devices 300 comprised in each physical disk group 5. The disk control portions 140A to 140D and each of the disk storage devices 300 are connected via for example a SAN or other communication network, to perform data transfer in block units according to a fiber channel protocol. Also, each of the disk control portions 140A to 140D monitors the state of the disk storage devices 300 as necessary, and the results of this monitoring are transmitted to the SVP 160 via an internal communication network (for example, a LAN) 151.

One or a plurality of CMs 130 are for example volatile or nonvolatile memory. Cache areas are secured in the CM 130, in which are stored data transmitted and received between the channel control portions 110A to 110D and disk control portions 140A to 140D. This data may be redundantly managed by a plurality of CMs 130.

One or a plurality of SM 120 are configured for example from non-volatile memory, and store control information and similar (control information and similar may for example be redundantly managed by a plurality of SMs 120 as well). Control information and similar includes, for example, various commands exchanged between the channel control portions 110A to 110D and disk control portions 140A to 140D, cache management tables, disk management tables, and LU-LDEV management tables. Cache management tables are tables in which are written, for example, correspondence relationships between cache areas and the logical addresses of LDEVs, described below. Disk management tables are tables for management of each of the disk storage devices 300, and have for each disk storage device 300, for example, a disk ID, vendor, storage capacity, RAID level, state of use (for example, in use or unused), and similar. LU-LDEV management tables are tables for management of LDEVs, described below, and have for each LDEV, for example, logical path information (for example, a port number, target ID, and LUN), address management information (for example, the correspondence relationship between physical addresses on the disk storage device 300 and logical addresses in the LDEV), storage capacity, and RAID level. A physical address may be, for example, address information including the ID of the disk storage device 300, the disk head number, and the number of sectors. A logical address may be address information containing for example an LUN (Logical Unit Number), LDEV number, and logical block address.

The connection portion 150 interconnects each of the channel control portions 110A to 110D, each of the disk control portions 140A to 140D, the CM 130, and the SM 120. The exchange of data and commands between the channel control portions 110A to 110D, the CM 130, the SM 120, and the disk control portions 140A to 140D, is performed via the connection portion 150. The connection portion 150 comprises, for example, a first sub-connection portion through which user data passes, and a second sub-connection portion through which control information and similar passes. The first sub-connection portion is connected to the channel control portions 110A to 110D, the disk control portions 140A to 140D, and the CM 130; the second sub-connection portion is connected to the channel control portions 110A to 110D, the disk control portions 140A to 140D, and the SM 120. Of the first sub-connection portion and the second sub-connection portion, at least the first sub-connection portion is an ultra-high-speed crossbar switch performing data transmission through high-speed switching or another high-speed bus.

Each of the plurality of disk storage devices 300 is, for example, a hard disk drive, semiconductor memory device, or similar. A RAID group 2 is configured from a prescribed number, equal to two or greater, of disk storage devices 300 among the plurality of disk storage devices 300. A RAID group 2 is also called a parity group or error correction group, and is a group of disk storage devices 300 conforming to RAID principles. Two or more disk storage devices 300 belonging to the same RAID group 2 are for example mounted on different motherboards, so that if there is a fault in one of the disk storage devices 300, the data of the remaining disk storage device 300 can be used to restore the data of the faulty disk storage device 300. A plurality of LDEVs (Logical Devices), which are logical storage devices, are set on the physical storage area provided by the RAID group 2, and one or more LDEVs among the plurality of LDEVs are provided, as a single LU (Logical Unit) 310 having an LUN (Logical Unit Number), by the storage control device 100 to the host terminals 200A to 200D. Each LU 310 may, as a primary LU (data copy source LU), form a pair with another LU 310 as a secondary LU (data copy destination LU); in this case, the entirety or a portion of the data within the LU 310 (for example, un-updated data) may be copied to the other LU 310. Also, each LU 310 may, as a secondary LU, form a pair with another LU 310 as a primary LU; in this case, the entirety or a portion of the data within the other LU 310 (for example, un-updated data) may be copied to the LU 310.

The SVP 160 is a computer machine to maintain or manage the storage system 600. The SVP 600 can for example collect information via an internal LAN or other communication network 151 from each of the components of the storage control system 600 (for example, from each of the channel control portions 110A to 110D and each of the disk control portions 140A to 140D). Specifically, the OS (operating system), application programs, driver software and similar installed in each of the components (for example, the channel control portions and disk control portions) of the storage control system 600 are configured to output fault occurrence information relating to faults occurring in each of the components, and the SVP 160 can receive this fault occurrence information. Information received by the SVP 160 includes, for example, the device configuration, power supply alarm, temperature alarm, input/output rate (for example, the number of I/O requests received by the storage control device 100 per unit time), and similar. Also, the SVP 160 can for example, in response to action by an operator, configure a disk storage device 300, configure an LDEV, install a micro-program for execution in the channel control portions 110A to 110D, and similar. The SVP 160 can also, for example, confirm the state of operation of the storage control system 600 and identify fault locations, install an operating system to be executed by a channel control portion 110, and perform other tasks. Also, the SVP 160 may be connected to an external maintenance center (not shown) via a LAN, telephone lines, or other communication network, and may notify this external maintenance center of fault occurrence information received from the various components of the storage control system 600. The SVP 160 may be incorporated within the storage control system 600, or may be external to the system.

The above is a basic explanation of the storage control system 600. In this storage control system 600, for example one channel control portion and one disk control portion may be integrally configured as one module, and this one module may realize the functions of the channel control portion and disk control portion. Also, the SM 120 and CM 130 may for example be configured integrally. One LUN may be allocated to each channel control portion, or one LUN may be allocated to a plurality of channel control portions. Also, a separate storage control system may be connected to the storage control system 600. In this case, a primary LU of the storage control system 600 may be put into a paired state with a secondary LU of the other storage control system, and the host terminals 200A to 200D connected to the storage control system 600 may access the secondary LU within the other storage control system via the storage control system 600. Also, the storage control system 600 may for example receive both file access requests and block access requests, or may receive only file access requests (for example NAS), or may receive only block access requests.

Figure 3:
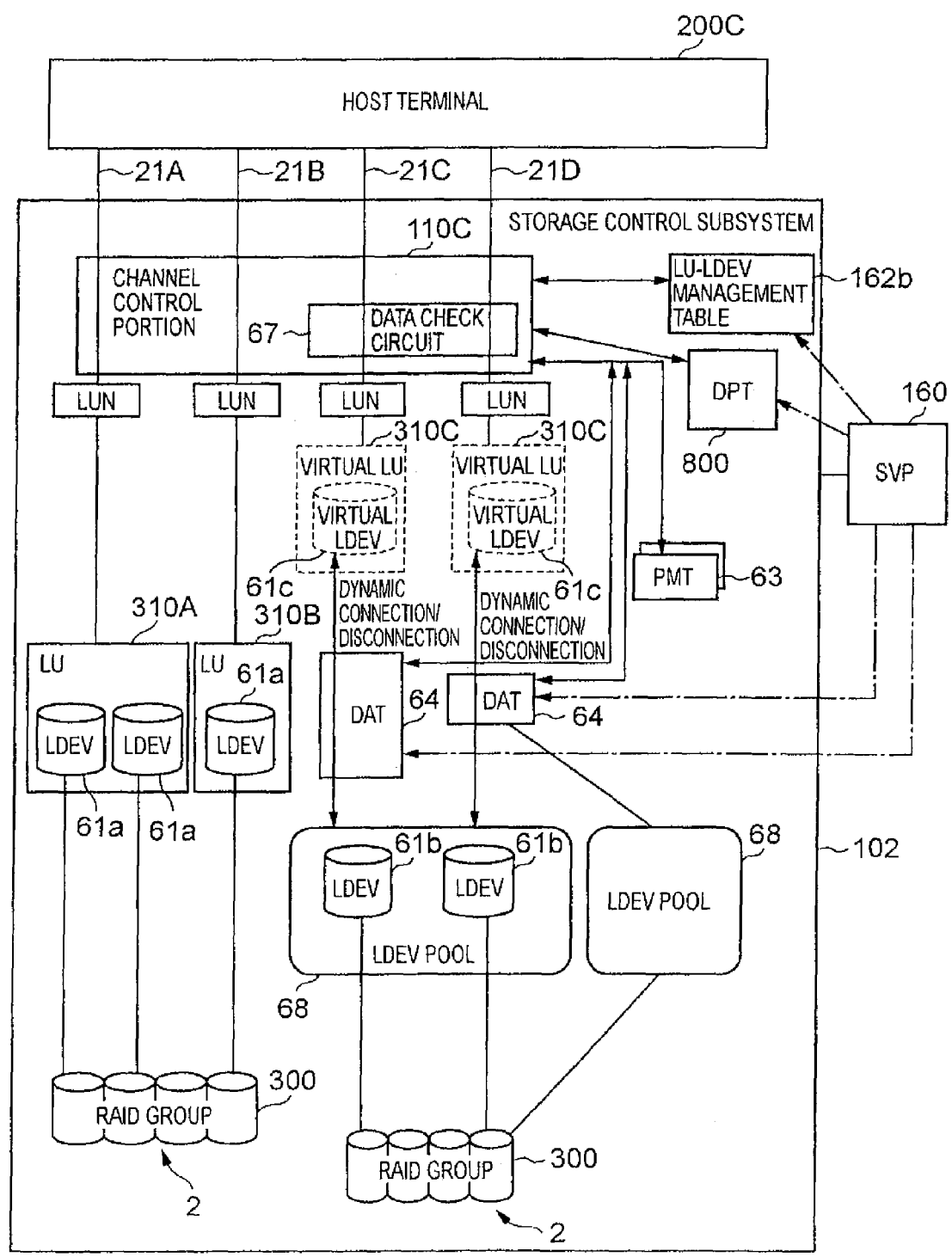
FIG. 3 is a block diagram showing the functions of a storage control subsystem of this aspect.

FIG. 3 is a block diagram showing the functions of a storage control subsystem 102 of this aspect. In the following explanation, in order to facilitate understanding, the example of the host terminal 200C among the host terminals 200A to 200D is considered, and an example is considered in which, among the channel control portions 110A to 110D, the channel control portion 110C receives block access requests from the host terminal 200C.

One or a plurality of logical communication paths (hereafter called "logical paths") 21A to 21D are formed between the host terminal 200C and the storage control subsystem 102. Each of the logical paths 21A to 21D is formed based for example on the number of a port of the storage control subsystem 102 (a port connected to the host terminal 100A), a target ID, and an LUN.

The plurality of LDEVs prepared on one or a pluralityt of RAID groups 2 include, for example, LDEVs having the attributes of normal LDEVs (hereafter called normal LDEVs) 61a, and LDEVs having the attributes of pool LDEVs (hereafter called pool LDEVs) 61b. Each LDEV can be changed from a normal LDEV 61a to a pool LDEV 61b on instruction by the operator of the SVP 160, and conversely can change from a pool LDEV 61b to a normal LDEV 61a.

A normal LDEV 61a is an LDEV which can be accessed by the host terminal 200C. In other words, when an LUN with the logical path 21A is specified by the host terminal 200C, two normal LDEVs 61a associated with this LUN are supplied, as the LU 310A, to the host terminal 200C. Also, when for example an LUN with the logical path 21B is specified by the host terminal 200C, one normal LDEV 61a associated with this LUN is provided, as the LU 310B, to the host terminal 200C.

A pool LDEV 61b is a member constituting an LDEV pool 68, and is an LDEV which cannot be accessed by a host. In other words, a pool LDEV 61b is not associated with an LUN which can be specified by the host terminal 200C, and even if an LUN is specified, the pool LDEV 61b is not itself provided to the host terminal 200C.

One or a plurality of virtual LUs 310C provided to the host terminal 200C exist above the LDEV pool 68. A virtual LU 310C is an LU provided to the host terminal 200C, but in contrast with other LUs 310A and 310B, is a virtual LU not having a physical data storage area in the RAID group 2. More specifically, a virtual LU 310C comprises one (or a plurality of) virtual LDEV 61c, but the virtual LDEV 61c differs from a normal LDEV 61a and pool LDEV 61b in being a virtual LDEV not having a physical data storage area in the RAID group 2. Each of the plurality of virtual addresses of the virtual LDEV 61c is dynamically associated with a logical address selected from the plurality of logical addresses of the pool LDEV 68 via a dynamic addressing table (hereafter abbreviated "DAT"), and when this association is canceled the logical address is released.

Figure 4:
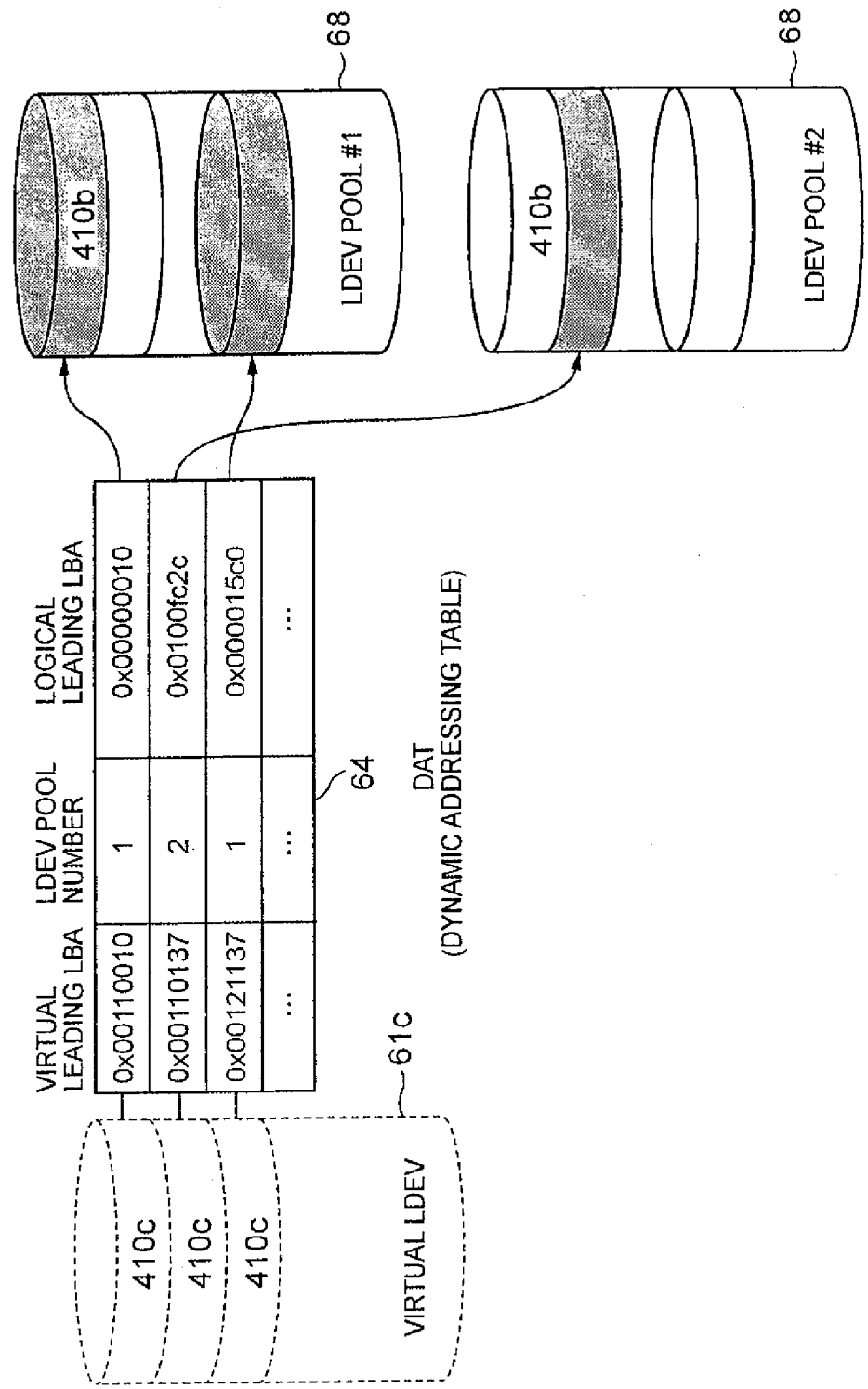
FIG. 4 shows an example of the configuration of a virtual LDEV 61c, LDEV pool 68, and DAT 64.

FIG. 4 shows an example of the configuration of a virtual LDEV 61c, LDEV pool 68, and DAT 64.

The virtual LDEV 61c comprises a plurality of virtual chunks 410c, 410c, . . . , having for example a constant size (such as 64 kilobytes). Each virtual chunk 410c comprises a prescribed number (such as 128) of logical blocks (each with for example 512 bytes). In each virtual chunk 410c exists a leading logical block address (hereafter abbreviated to "virtual leading LBA"), enabling identification of a virtual chunk 410c through the virtual leading LBA.

Each LDEV pool 68 is a collection of one or more LDEVs 61b, and comprises a plurality of logical chunks 410b, 410b, . . . , having a fixed size (for example, 64 kilobytes). Each logical chunk 61b comprises a prescribed number (for example, 128) of logical blocks (each with for example 512 bytes). In each logical chunk 410b exists a leading logical block address (hereafter abbreviated to "logical leading LBA"), enabling identification of a logical chunk 410c through the logical leading LBA. When for example a logical leading LBA to be accessed is determined, the corresponding chunk number is determined. Specifically, if for example the logical chunk size is 64 kB (=128 blocks), then the logical chunk number n is the integer portion of the logical block number m/128 (for example, the number of a logical chunk having logical blocks with logical block numbers 0 to 127 is zero, and the number of a logical chunk having logical blocks with logical block numbers 128 to 255 is 1).

The DAT 64 is registered in a storage area (for example, the SM 120) within the storage control subsystem 102 from an external terminal (for example, the SVP 160). A DAT 64 is prepared for each virtual LDEV 61c, and is a table which associates each virtual chunk 410c of the virtual LDEV 61c with a logical chunk 410b of one or more LDEV pools 68. Specifically, for example, for each virtual leading LBA, identification information (for example the LDEV pool number) of the LDEV pool 68 associated with the virtual leading LBA and the logical leading LBA in the LDEV pool 68 are stated in the DAT 64. The contents of the DAT 64 are updated by the channel control portion 110A with prescribed timing, for example, when the channel control portion 110A receives an I/O request. The channel control portion 110A references the pool management table (hereafter abbreviated "DAT") to update the contents of the DAT 64.

Figure 5:
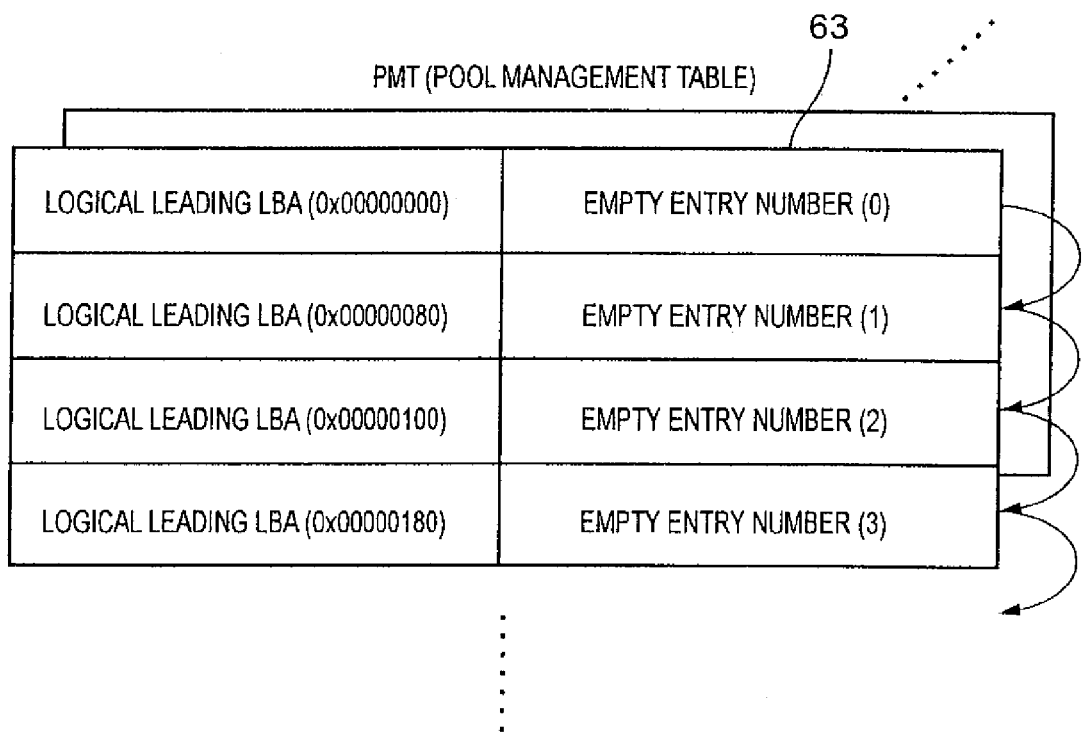
FIG. 5 shows an example of the configuration of a PMT 63.

FIG. 5 shows an example of the configuration of a PMT 63.

A PMT 63 exists for each LDEV pool 68, and is registered from an external terminal (for example, the SVP 160) in a storage area (for example, SM 120) within the storage control subsystem 102. An entry number is allocated for each logical chunk 401b of the LDEV pool 68. In each PMT 63 is entered at the top the number of the first empty entry in the corresponding LDEV pool 68 (that is, the chunk number for the smallest logical leading LBA), with other empty entry numbers following in a queue format.

Below, the flow of processing of the channel control portion 110C to dynamically associate the virtual LDEV 61c and LDEV pool 68 is explained, referring to FIG. 6.

The host terminal 200C outputs an I/O request to the virtual LU 310C by a method similar to that used when accessing a normal LU 310A. The channel control portion 110C, upon receiving an I/O request from the host terminal 200C (step S11), associates the virtual leading LBA determined from the I/O request with a logical leading LBA of the LDEV pool 68. Specifically, the channel control portion 110C references the DAT 64 corresponding to the virtual LDEV 61c of the virtual LU 310C which has received the I/O request, and acquires the LDEV pool number corresponding to the above determined virtual leading LBA (S12). Next, the channel control portion 110C acquires, from the PMT 63 corresponding to the LDEV pool number acquired, the logical leading LBA corresponding to the first empty entry number written in the PMT 63, and registers this logical leading LBA in the position (in the DAT 64) corresponding to the above virtual leading LBA (S13). By this means, a logical leading LBA is associated with the above virtual leading LBA, and it becomes possible to read data from the logical chunk having the logical leading LBA and to write data to the logical chunk.

Further, the channel control portion 110C can release the logical leading LBA written to the DAT 64 after for example the processing based on the above I/O request has ended ("Y" in S14). Specifically, the channel control portion 110C can for example delete the above logical leading LBA registered in the DAT 64 from the DAT 64, and store in the PMT 63 the above logical leading LBA and the entry number corresponding thereto (S15).

In the above flow, dynamic association of, and cancellation of the association between, the virtual LU 310C (virtual LDEV 61c) and LDEV pool 68 are performed. In this way, an LDEV pool 68 comprising pool LDEVs 61b, 61b, . . . , not allocated in advance for access from any host terminal, is prepared, and storage areas in this LDEV pool 68 are flexibly associated with virtual LUs 310C (virtual LDEVs 61c), to effectively utilize empty storage areas.

FIG. 7 shows an example of the configuration of an LU-LDEV management table 162b of this aspect.

The LU-LDEV management table 162b is registered in a storage area (for example the SM 120) in the storage control subsystem 102. In the LU-LDEV management table 162b are recorded, for example, for each of the ports comprised in the storage control system 600 (ports connected to host terminals), the port number, one or more target IDs belonging to the port number, one or more LUNs belonging to each target ID, and LDEV information for one or more LDEVs belonging to each LUN. The LDEV information for each LDEV includes, for example, the LDEV number, storage capacity, RAID level, the above-described address management information, LDEV attributes, DAT-ID, and LDEV pool number and state.

The LDEV attributes include for example the above-described pool LDEV, normal LDEV or virtual LDEV.

An LDEV with the "pool LDEV" attribute (the above-described pool LDEV 61b) is configured so as not to be accessed from a host terminal, and so logical path information (for example, a LUN) is not associated with a pool LDEV 61b. Moreover, an LDEV pool number is associated with a pool LDEV 61b such that the LDEV pool 68 of which the pool LDEV is a member can be identified.

An LDEV with the "virtual LDEV" attribute (the above-described virtual LDEV 61c) is associated with the ID (for example, zero) of the DAT 64 corresponding to the LDEV 61c. By referencing this DAT-ID, it is possible to determine which DAT to reference when a virtual LDEV 61c (virtual LU 310C) is accessed. An LDEV pool number is associated with a virtual LDEV 61c such that the LDEV pool 68 of which the virtual LDEV is a member can be identified.

An LDEV with the "normal LDEV" attribute (the above-described normal LDEV 61a) has no associated DAT-ID or LDEV pool number.

As LDEV states, for example, there are a "Ready" state (for example, the mounted state) indicating that access is possible, and a "Not Ready" state (for example, the unmounted state) indicating that access is not possible.

The channel control portion 110C performs processing, based on a data pattern for data received from the host terminal 200C (or on data acquired from an LU; hereafter called "host data"), to determine whether host data is to be passed to the disk control portions 140A to 140D via the CM 130, or whether the host data is to be erased without being passed to the disk control portions 140A to 140D (in other words, processing to determine whether host data is to be stored in a disk storage device 300 or whether the host data is to be erased without storing in a disk storage device 300). This processing is useful when for example format data, described below, is output from the host terminal 200C in order to format an LU (one or more LDEVs). A detailed explanation follows.

Figure 8:
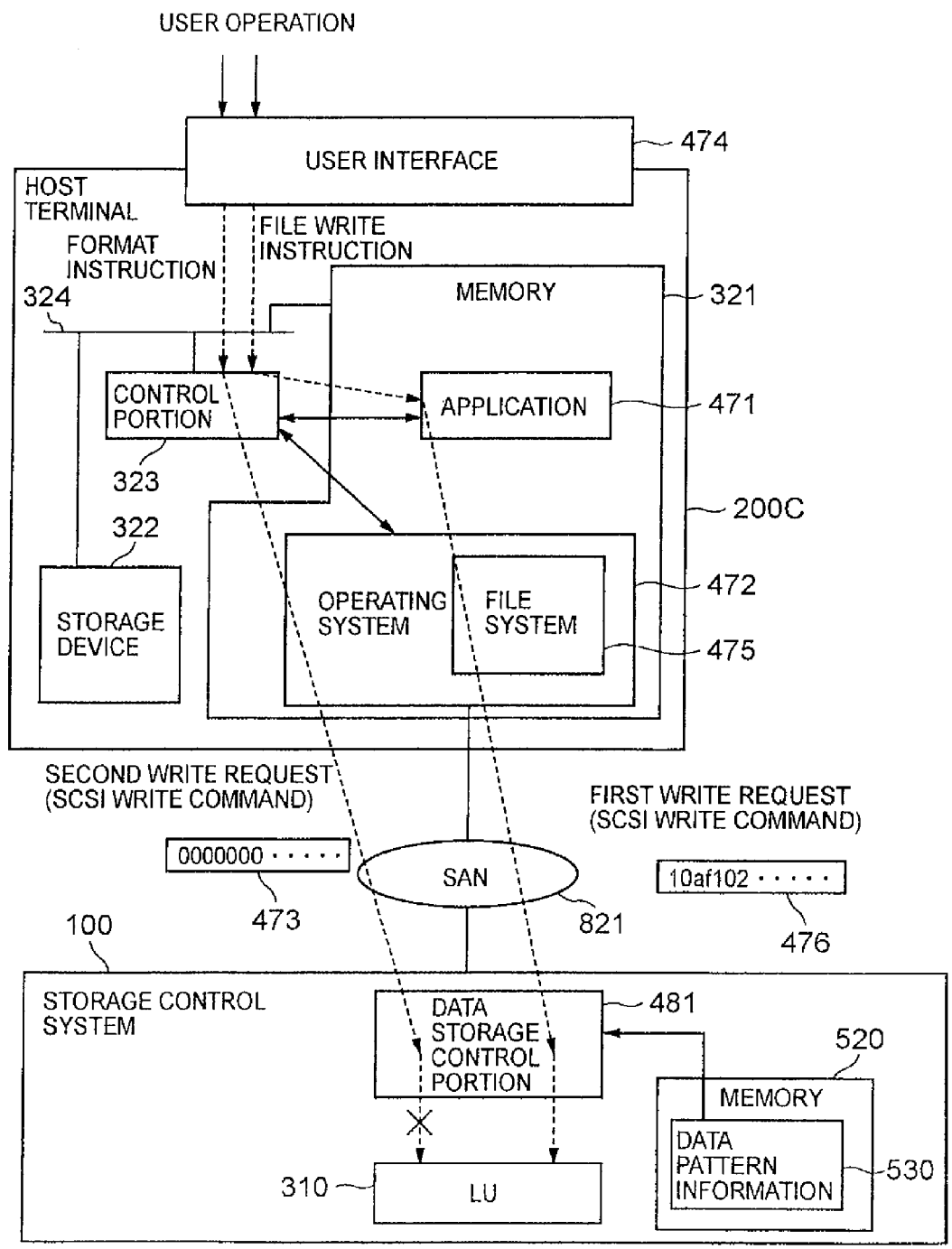
FIG. 8 shows an example of the software configuration in the host terminal 200C, and an example of a write request output from the host terminal 200C.

FIG. 8 shows an example of the software configuration in the host terminal 200C, and an example of a write request output from the host terminal 200C.

A control portion (for example, a CPU) 323, memory 321, storage device (for example, a hard disk drive) 322, and user interface (for example, a keyboard or other input device) 474 are connected to the internal bus 324 of the host terminal 200C. UNIX (a registered trademark) or another operating system (hereafter "OS") 472 and an application program 471 running on the OS 472 are loaded from for example the storage device 322 and stored in the memory 321 of the host terminal 200C. The OS 472 and application program 471 function by being read into the control portion 323.

The user interface 474 notifies the application program 471 or OS 472 of the results of user operations.

The application program 471, upon for example receiving an instruction from the user interface to write a data file to a user-specified LU, transmits to the OS 472 a file-writing instruction signifying the writing of the data file to the user-specified LU.

The OS 472, upon receiving a file-writing instruction from the application program 471, references its won file system 475 and converts the data file into block data 476, generates a first write request (block access request, for example a SCSI command) signifying the writing to the user-specified LU of the block data 476, and transmits this first write request to the storage control subsystem 102.

When a prescribed event occurs (for example, when the power supply is turned on or the OS 472 is restarted), the OS 472 transmits to the storage control subsystem 102 a system information request command (for example, a read capacity command or device discovery command) to request system information regarding the storage control subsystem 102 from the storage control subsystem 102. In this case, the host terminal 200C receives system information (for example, information relating to all the LUs which can be accessed by the host terminal 200C (for example, the logical path information and storage capacity)) from the storage control subsystem 102, and stores this system information in a storage area (for example, memory or a hard disk) within the host terminal 200C.

When for example the OS 472 receives a prescribed command from the user interface 474 without the intervention of the application program 471, a second write request having host data with a constant data pattern is generated based on this command and is transmitted to the storage control subsystem 102. Specifically, when for example the OS 472 receives from the user interface 474 a format instruction signifying formatting of a user-specified LU, a second write request (block access request, for example a SCSI write command) comprising format data 473 of the same size as the storage capacity of the user-specified LU is generated, and this second write request is transmitted to the storage control subsystem 102.

In other words, in this aspect a write request received from the host terminal 300C by the channel control portion 110C of the storage control subsystem 102 may be a first write request, having host data 476 the data pattern of which is not constant (that is, block data with no regularity in the data arrangement), or may be a second write request having host data the data pattern of which is constant (that is, block data having a regular data arrangement, for example format data 473). If a write request received by the channel control portion 110C is a second write request, and this second write request contains format data 473, this format data 473 is of the same size as the storage capacity of a user-specified LU, so that if a measure described below which is a characteristic point of this aspect is not executed, the format data 473 is written to the entirety of the user-specified LU. Hence because user data (for example, document data created by the user or similar) is not stored, a logical storage area (LDEV storage area) which normally would be empty is used to store data. A disadvantage is that the user-specified write destination LU is larger in the case of a virtual LU 310C than in the case of a normal LU 310A or 310B. This is because the empty storage space (for example, empty chunk) of a normal LDEV 61a having normal LUs 310A, 310B is allocated to a host terminal determined in advance by a logical path, and is not dynamically allocated, whereas the empty storage space (for example, empty chunk) of an LDEV pool 68 to which the virtual LU 310C is dynamically associated is not allocated to a host terminal determined in advance, but is allocated dynamically. That is, if the empty storage area of the LDEV pool 68 is reduced unnecessarily, the advantage of the virtual LU 310C and the above-described dynamic association does not readily appear.

Hence in this aspect, the measure explained below is adopted. Below, the basic concept of the principal portion of this aspect, and a specific example, are explained separately.

(1) Basic Concept of this Aspect

As shown in FIG. 8, the memory 520 comprised in the storage control subsystem 102 (for example, SM 120) stores data pattern information 530 (for example, a data pattern table (hereafter "DPT") 800, described below) indicating one or a plurality of data patterns of data (hereafter called "write-excluded data") which must not exist on the LU 310 (one or more LDEVs).

The storage control subsystem 102 comprises a data storage control portion 481 (for example, channel control portions 110C, 110D or disk control portions 140A to 140C having a data check circuit 67). The data storage control portion 481 judges whether the data pattern of data exchanged with the host terminal 200C (hereafter called host data) conforms to (for example, coincides with) any of the one or a plurality of data patterns comprised in the above data pattern information. If a negative judgment result is obtained, the data storage control portion 481 stores the host data in the LU 310 or transfers the host data to the host terminal 200C. If on the other hand a positive judgment result is obtained, because the host data is write-excluded data, the data storage control portion 481 does not store the host data in the LU (and erases the host data if it exists in the LU).

According to this basic concept, when for example the storage control subsystem 102 receives a first write request, the data pattern of the block data contained in the first write request is not constant, and so does not conform to any of the one or a plurality of data patterns contained in the data pattern information 530, so that the block data 476 is stored in the LU 310. However, if the storage control subsystem 102 receives a second write request, because the data pattern of the block data (for example, format data 473) contained in the second write request is constant, the data pattern conforms to one of the one or a plurality of data patterns contained in the data pattern information 530, and so this block data is not stored in the LU 310 (and if in the LU 310, is erased).

(2) First Specific Example of this Aspect

The first specific example is an example of a case in which the channel control portion 110C receives from the host terminal 300C an I/O request for the virtual LU 310C (virtual LDEV 61*c*). A detailed explanation follows.

FIG. 9 shows an example of the configuration of the DPT 800 shown in FIG. 3.

The DPT 800 is registered in at least one among for example the memory installed in the channel control portion 110C, the memory installed in the disk control portions 140A to 140D, the CM 130, and the SM 120. The DPT 800 is for example registered from an external terminal (for example the SVP 160). One or a plurality of data patterns, and a validity flag indicating whether data patterns registered for the LDEV are valid, are registered in the DPT 800 for each LDEV (for example, the virtual LDEV 61*c*).

Each of the one or a plurality of data patterns has a constant pattern, such as for example the data pattern of format data. The data pattern of format data differs for each OS (for example, the type or version), so that the LDEV in which data is stored is input based on the OS from which the data will be output. Registration of one or a plurality of data patterns in the DPT 800 may be performed manually by a user at an external terminal, or may be performed automatically by a computer program. Further, at least one among the data length of a data pattern and the maximum data length is determined in advance. For example, at least one among the data length of data patterns and the maximum data length is a multiple of or divisor of the storage size of a logical chunk.

If the validity flag of an LDEV is for example "1", the data patterns associated with the LDEV are valid, and if for example the flag is "0", the data patterns are invalid. If valid, the data pattern is used and is compared with the data pattern of the host data, and if invalid (for example, if a data pattern is not registered in the corresponding entry), this comparison processing is not performed.

The LDEV information registered in this DPT 800 may be information for a virtual LDEV 61*c*, or may be information for a normal LDEV 61*a*; but it is thought that information for a virtual LDEV 61*c* is preferable. Also, data patterns are registered in the DPT 800 by OS.

Figure 10:
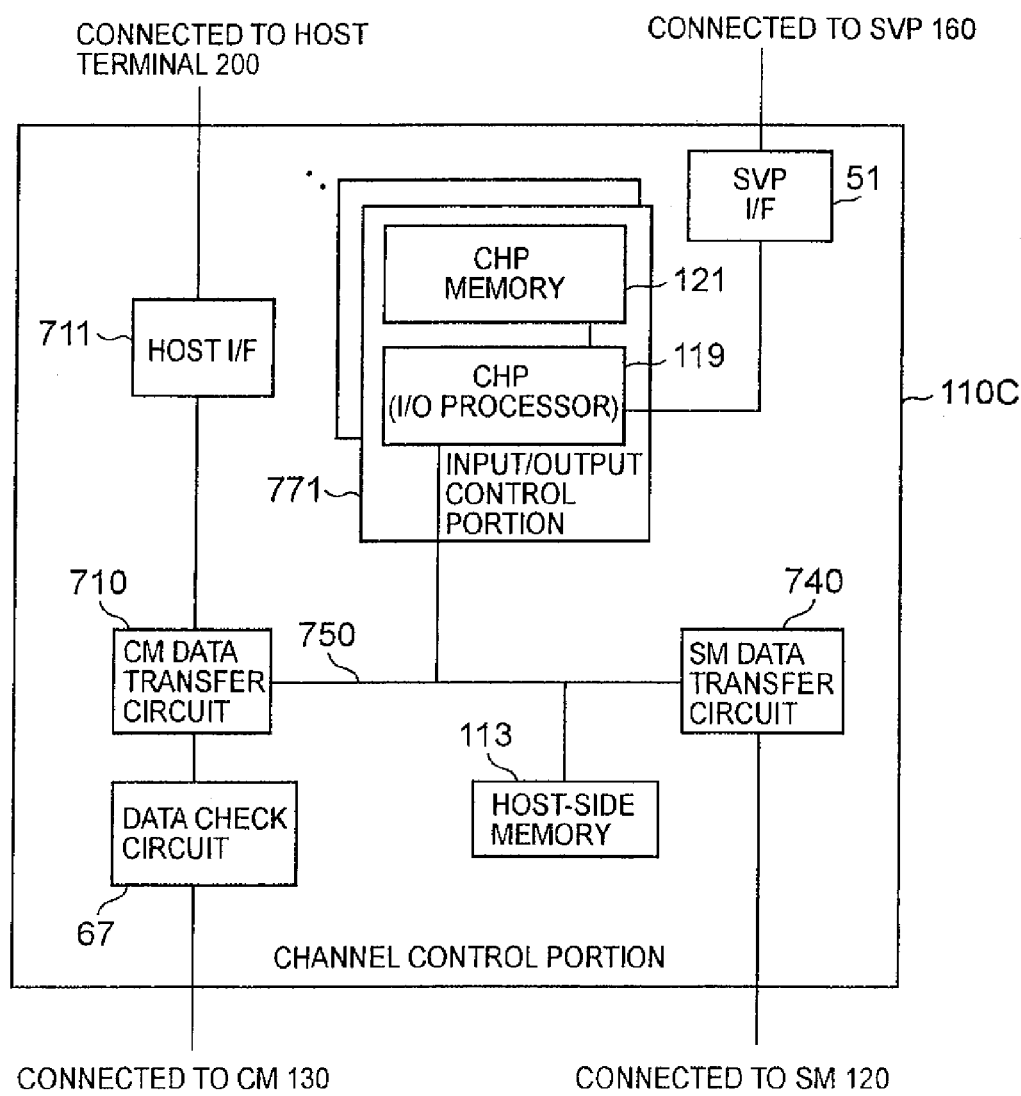
FIG. 10 shows an example of the configuration of a channel control portion 110C.

FIG. 10 shows an example of the configuration of a channel control portion 110C.

The channel control portion 110C comprises a board in which hardware components are integrated into a unit. The channel control portion 110C comprises a connector for board connection, not shown, and by mating this board connection connector with a prescribed connector of the storage control device 100, the channel control portion 110C is electrically connected to the storage control device 100. The channel control portion 110C comprises, for example, a host interface portion (hereafter "host I/F") 711, SVP interface portion (hereafter "SVP I/F") 51, host-side memory 113, one or a plurality of input/output control portions 771, CM data transfer circuit 710, SM data transfer circuit 740, internal bus 750, and data check circuit 67. The internal bus 750 is connected to the CHP (channel processor) 119, host-side memory 113, CM data transfer circuit 710, and SM data transfer circuit 740.

The host I/F 711 is a communication interface for performing communication with the host terminal 200C, and for example receives block access requests transmitted from the host terminal 200C according to the fiber channel protocol.

The SVP I/F 51 is connected to the SVP 160 via an internal LAN 150 or other communication network, and is also connected to the CHP 119, described below. The SVP I/F 51 is a communication interface (for example, a LAN controller) for controlling communication between the SVP 160 and CHP 119.

Various programs and data used by the CHP 119 are stored in the host-side memory 113. Specifically, data patterns used by the data check circuit 67 and other data is stored at an address determined in advance of the host-side memory 113. This data pattern and similar may be the DPT 800 itself read from the SM 120, or may be data patterns for LDEVs capable of storing data output from the channel control portion 110C.

The data check circuit 67 is provided at a prescribed location in the channel control portion 110C, such as between the CM data transfer circuit 710 and CM 130. The data check circuit 67 can be configured from hardware circuitry, software, or a combination thereof (for example, a pure hardware circuit). The data check circuit 67 performs comparisons of the data pattern of host data and one or a plurality of data patterns (for example, the DPT 800) stored in the host-side memory 113 (below, this is called "data pattern comparison"). The data check circuit 67 has a register, not shown, and the result of data pattern comparison (that is, whether the data pattern of the host data conforms to any of the above one or a plurality of data patterns) is written to this register.

The CM data transfer circuit 710 is hardware which executes data transfer between the host terminal 110C and CM 130. The CM data transfer circuit 710 transfers data from the CM 130 to the host terminal 110C, and conversely transfers data from the host terminal 110C to the CM 130, according to instructions of the CHP 119.

The SM data transfer circuit 740 is hardware which executes data transfer between the host-side memory 113 and SM 120. The SM data transfer circuit 740 transfers data from the SM 120 to the host-side memory 113, and conversely transfers data from the host-side memory 113 to the SM 120, according to instructions of the CHP 119.

Each input/output control portion 771 is a portion (for example, a microprocessor unit) which exchanges data and commands between the disk control portions 140A to 140D, CM 130, SM 120, and SVP 160. Each of the input/output control portions 771 comprises a CHP (channel processor) 121 and CHP memory 119.

The CHP (channel processor) 121 is for example a microprocessor which governs control of the entirety of the channel control portion 110C, and which controls communications between the disk control portions 140A to 140D, host terminal 200C, and SVP 160. The CHP 121, by executing various computer programs stored in the CHP memory 121 (or in host-side memory 113), realizes the functions of the channel control portion 110C. For example, the CHP 121 reads the register (not shown) of the data check circuit 67 to detect the result of the above data pattern comparison, and according to this comparison result determines whether host data is to be erased.

The CHP memory 119 is volatile or non-volatile memory (for example, NVRAM (Non-Volatile RAM)), and stores for example a computer program which governs control of the CHP 121.

The above is an example of configuration of the channel control portion 110C. The configuration shown in FIG. 10 is merely one example and configurations other than this can be adopted. Also, this configuration can be applied to other channel control portions 110D receiving block access requests as well.

Figure 11:
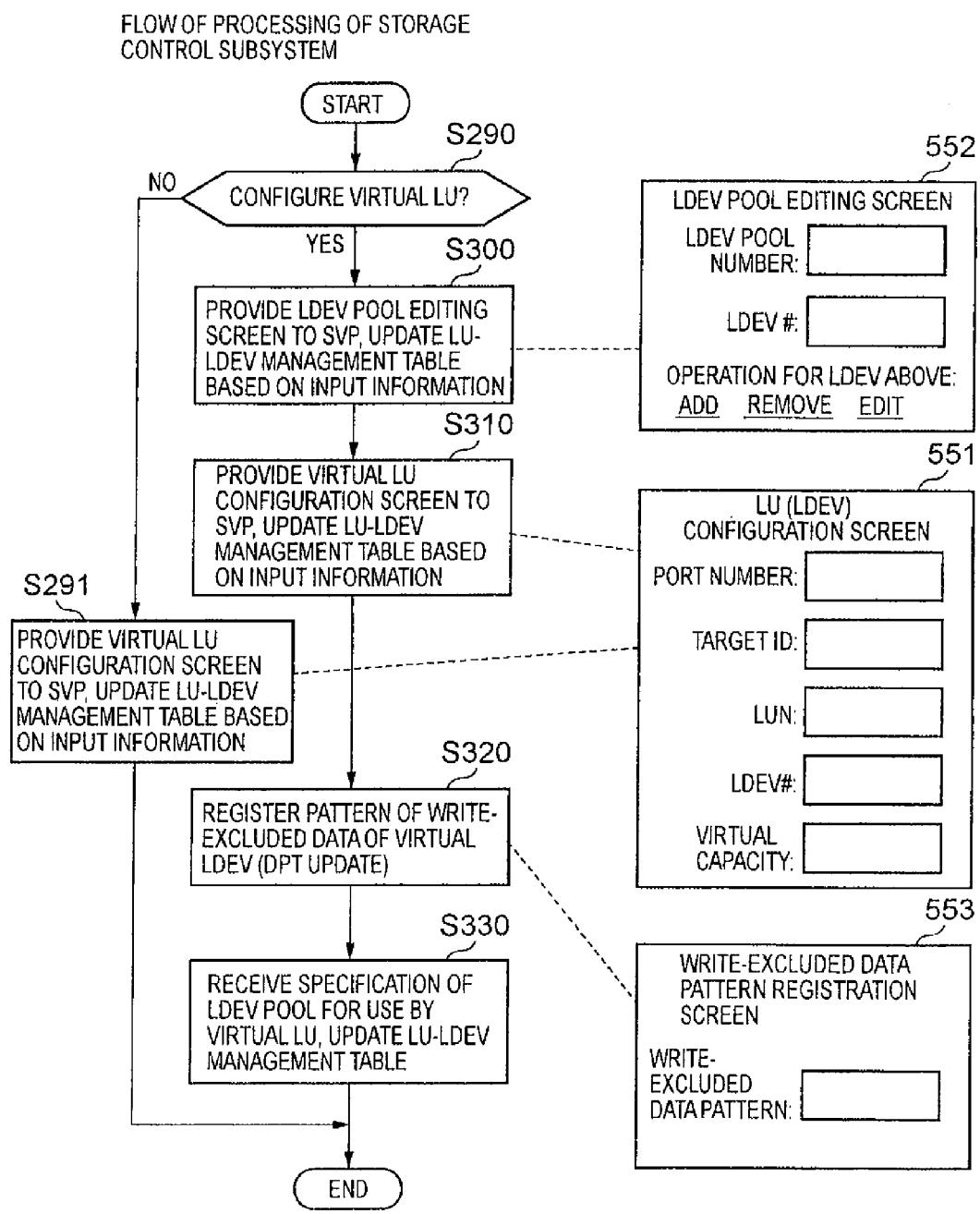
FIG. 11 shows the flow of processing of a storage control subsystem 102 when the LU is configured.

FIG. 11 shows the flow of processing of a storage control subsystem 102 when the LU is configured.

The processing shown in this figure is executed for example by the channel control portion 110C.

The channel control portion 110C receives from the SVP 160 a selection of whether to define a virtual LU or a normal LU (step S290).

In S290, when the selection of a virtual LU is received ("YES" in S290), the channel control portion 110C receives a request for creation of an LDEV pool from the SVP 160 (or from an external terminal connected thereto). In response to this request, the channel control portion 110C provides an LDEV pool editing screen 552 to the SVP 160. This screen 552 has, for example, a field for input of the number of the LDEV pool to be created, and a field for input of LDEV numbers for addition to or deletion from the LDEV pool, or for editing. Also, the screen 552 may be provided with tools for receiving selections as to whether to add, delete, or edit the LDEV numbers input to the LDEV number input field.

The channel control portion 110C performs LDEV pool creation (or editing) according to the information input to the LDEV pool editing screen 552 (in other words, the LU-LDEV management table 162b is updated) (step S300).

Then, the channel control portion 110C provides the LU configuration screen 551 to the SVP 160. This screen 551 has fields for input of the port number associated with the virtual LU (virtual LDEV), target ID, LUN, LDEV number, and storage capacity.

The channel control portion 110C defines the virtual LU according to the information input to the LU configuration screen 551 (in other words, information relating to a new virtual LDEV, having the LDEV attribute "virtual LDEV", is registered in the LU-LDEV management table 162b) (S310).

Following S310, the channel control portion 110C provides to the SVP 160 a write-excluded data pattern registration screen 553, to receive input of a data pattern (that is, a data pattern for write-excluded data) associated with the virtual LDEV (virtual LU) registered using the virtual LU configuration screen 551. When one or a plurality of data patterns are input to this screen 553, the channel control portion 110C associates the input one or a plurality of data patterns with the information input to the virtual LU configuration screen 551 (for example, the LDEV number), and registers this in the DPT 800 (S320).

Then, the channel control portion 110C receives a specification as to which LDEV pool the virtual LU defined in S310 is to use (for example, input of the LDEV pool number is received), and associates the specified LDEV pool with the virtual LU (virtual LDEV) (in other words, the input LDEV pool number is registered in the LU-LDEV management table 162b) (S330).

In S290, when selection of a normal LU is received ("NO" in S290), the channel control portion 110C provides the above-described LU configuration screen 551 to the SVP 160. The channel control portion 110C defines the LU according to the information input to the LU configuration screen 551 (here, information relating to one or more new normal LDEVs, having the LDEV attribute "normal LDEV", is registered in the LU-LDEV management table 162b) (S291).

By means of the above flow of processing, definition of a virtual LU (virtual LDEV) or of a normal LU (one or more normal LDEVs) is completed. Through this processing flow, the host terminal 300C can issue an I/O request to either a virtual LU or a normal LU.

In response to a prescribed command from the host terminal 200C (for example, an Inquiry command or a read capacity command based on SCSI protocol), the channel control portion 110C notifies the host terminal 200C of at least one piece of information among the plurality of pieces of information input in the above processing flow (for example, in the case of a virtual LDEV, the virtual storage capacity). Also, the channel control portion 110C, upon receiving from the host terminal 200C an I/O request for the virtual LU 310C, refuses the I/O request if the virtual LU 310C (virtual LDEV 61c) is not associated with at least one LDEV pool 68. In this case, the channel control portion 110C may for example notify the host terminal 200C of this fact, or may cause a timeout at the host terminal 200C without returning any response.

Figure 12:
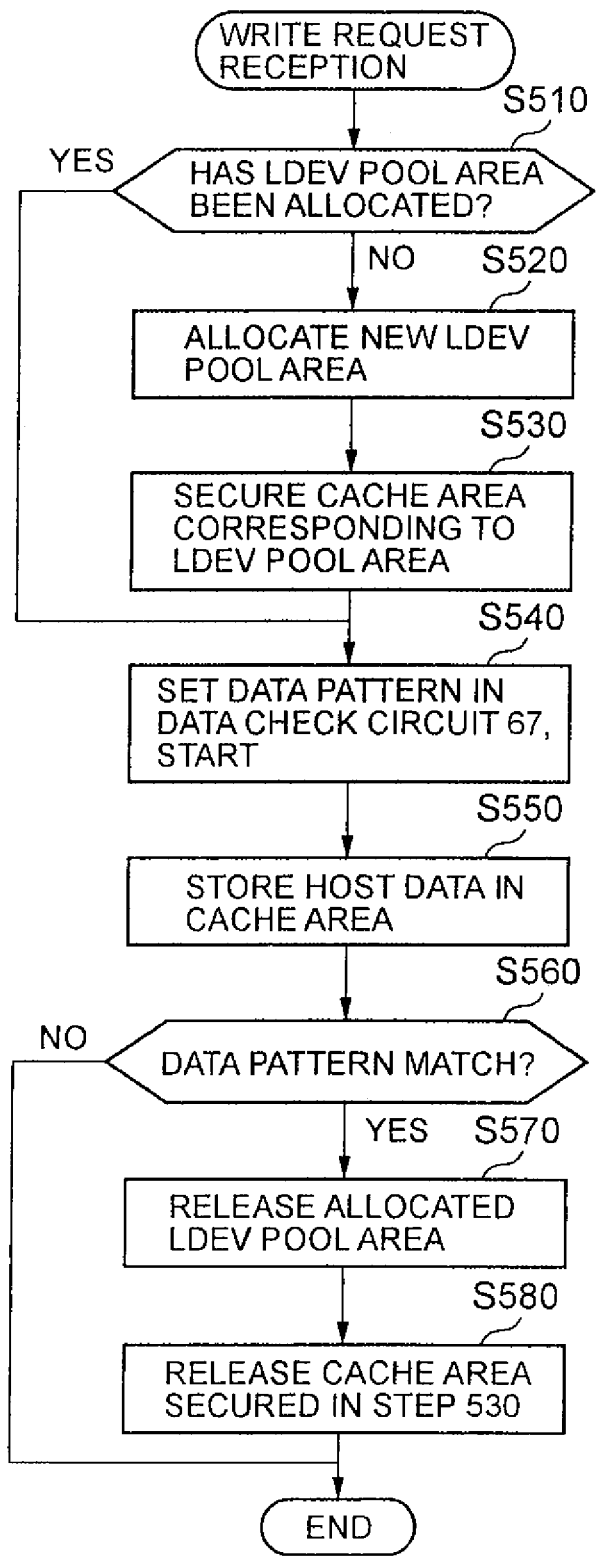
FIG. 12 shows the flow of processing of a channel control portion 110C when a write request for writing to the virtual LU 310C is received from the host terminal 110C.

FIG. 12 shows the flow of processing of a channel control portion 110C when a write request for writing to the virtual LU 310C is received from the host terminal 110C.

A write request received by the channel control portion 110C from the host terminal 200C comprises, in addition to the host data, information indicating to which storage area the host data is to be written, and specifically, information indicating from which block (for example, the leading logical block address) to which block (for example, the number of blocks) of which LU (for example, LUN) to write the data. In this aspect, one block, which is the data storage unit for each LDEV, is for example 512 bytes.

When the channel control portion 110C receives a write request for the virtual LU 310C from the host terminal 200C, the CHP 119 of the channel control portion 110C references the DAT 64 associated with the virtual LU 310 (virtual LDEV 61c), and judges whether the virtual storage area (for example, the virtual leading LBA) specified by the host terminal 200C is associated with a logical storage area (for example, logical leading LBA) of the LDEV pool 68 (S510).

If the result of the judgment of S510 is positive ("YES" in S510), the CHP 119 executes the processing of S540, described below.

Figure 6:
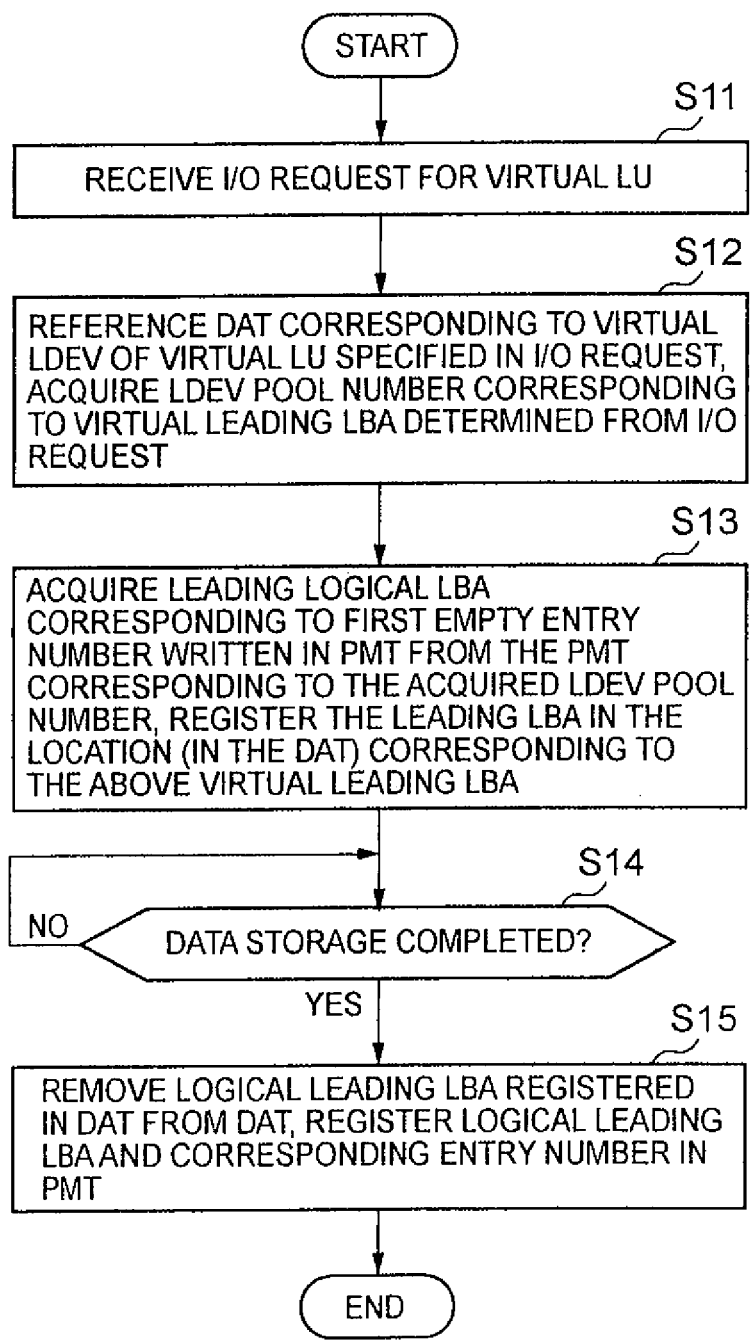
FIG. 6 shows the flow of processing of the channel control portion 110C which dynamically associates the virtual LDEV 61c and the LDEV pool 68.

If on the other hand the result of the judgment of S510 is negative ("NO" in S510), the CHP 119 performs the processing explained referring to FIG. 6, secures a logical storage area of the same size as the virtual storage area comprised in the write request (a logical storage area sufficient to store the host data) from the empty logical storage areas in the LDEV pool 68, and associates the logical storage area with the virtual storage area (S520). Also, the CHP 119 secures in the CM 130 a cache area of the same size as the secured logical storage area (S530).

After the result "YES" in S510, or after S530, the CHP 119 reads all or a portion of the data patterns written to the DPT 800 (for example, only the data patterns corresponding to the virtual LDEV 61c specified by the write request), sets the read data patterns in the data check circuit 67 (for example, in a register of the circuit 67), and starts the data check circuit 67 (S540). Next, the CHP 119 stores the host data contained in the received write request in the cache area secured in S530, via the CM data transfer circuit 710 and data check circuit 67 (S550).

Also, in S550 the data check circuit 67 performs a comparison to determine whether the host data input from the CM data transfer circuit 710 conforms to the data pattern set in S540. The data check circuit 67 writes the data pattern comparison result to the register.

Here, if for example the host data has a constant pattern such as in the case of format data, the data pattern comparison result is positive; if on the other hand there is no constant pattern, the data pattern comparison result is negative.

The CHP 119 accesses the register of the data check circuit 67, and if a positive data comparison result is written to the register, releases the logical storage area (storage area in the LDEV pool 68) allocated to the virtual storage area in S520 (that is, removes the associated logical leading LBA associated with the DAT 64) (S570). Also, the CHP 119 releases the cache area secured in S530 (S580). By this means, the host data written to the cache area is deleted, and there is no writing in the LDEV pool 68.

On the other hand, if a negative data comparison result is written to the register of the data check circuit 67, the CHP 119 ends the processing flow. By this means, the host data written to the cache area is acquired by one of the disk control portions 140A to 140D, and is stored in the logical storage area (that is, the pool LDEV 61*b* in the LDEV pool) allocated in S520.

Figure 13:
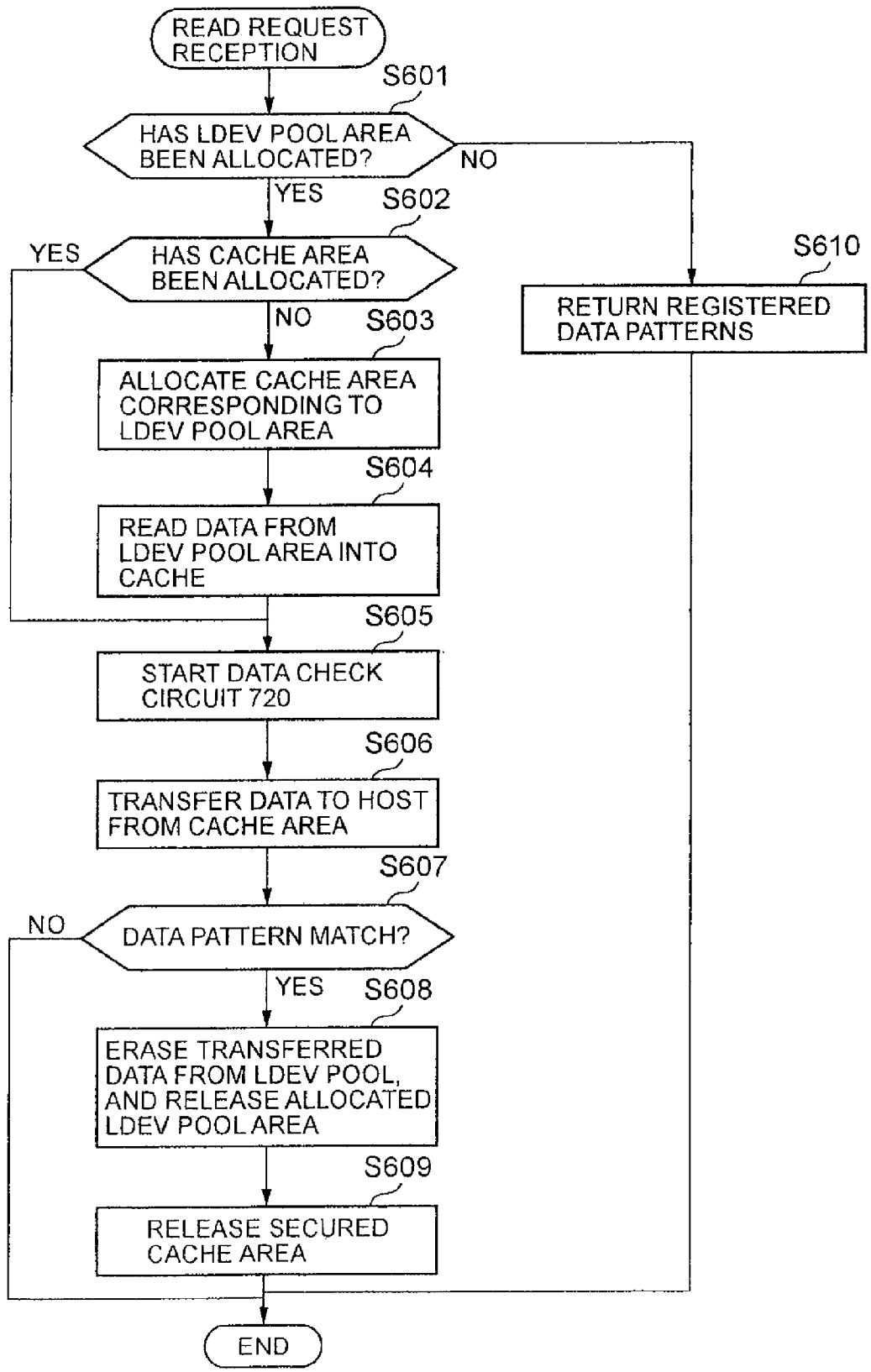
FIG. 13 shows the flow of processing of a channel control portion 110C when a read request for reading from the virtual LU 310C is received from the host terminal 110C.

FIG. 13 shows the flow of processing of a channel control portion 110C when a read request for reading from the virtual LU 310C is received from the host terminal 110C.

The read request received from the host terminal 200C by the channel control portion 110C comprises information indicating from which storage area data is to be read, and more specifically, for example, from which block (for example, a leading logical block address) to which block (for example, a number of blocks) of which LU (for example, a LUN) data is to be read.

When the channel control portion 110C receives a read request to read from the virtual LU 310C from the host terminal 200C, the CHP 119 of the channel control portion 110C references the DAT 64 associated with the virtual LU 310 (virtual LDEV 61*c*), and judges whether the virtual storage area (for example, virtual leading LBA) specified by the host terminal 200C is associated with a logical storage area (for example, logical leading LBA) of the LDEV pool 68 (S601).

When the result of the judgment of S601 is positive ("YES" in S601), if the cache area has not been secured ("NO" in S602), the CHP 119 performs the processing explained referring to FIG. 6, secures a logical storage area of the same size as the virtual storage area contained in the read request from the empty logical storage areas in the LDEV pool 68, and associates this logical storage area with the virtual storage area (S603). Also, the CHP 119 secures in the CM 130 a cache area of the same size as the secured logical storage area (S604).

In S602, if the cache area has already been secured ("YES" in S602), the CHP 119 performs the following processing of S605.

After "YES" in S602 or after S604, the CHP 119 reads all or a portion of the data patterns written to the DPT 800 (for example, only the data pattern corresponding to the virtual LDEV 61*c* specified by the read request), sets the read data pattern in the data check circuit 67, and starts the data check circuit 67 (S605). Next, the CHP 119 reads the data from the secured cache area, and transfers this data to the host terminal 200C (S606).

In S606, the data check circuit 67 performs a comparison to determine whether the data output from the CM data transfer circuit 710 conforms to the data pattern set in S605. The data check circuit 67 writes the data pattern comparison result in the register.

The CHP 119 accesses the register of the data check circuit 67, and if a positive data comparison result is written tot he register, erases the data transferred in S606 from the LDEV pool, and also releases the logical storage area allocated to the virtual storage area (S608). Through this S608, write-excluded data which had for some reason existed in the LDEV pool 68 is erased from the LDEV pool 68.

Thereafter, the CHP 119 releases the secured cache area (S609).

When the result of the judgment of S601 is negative ("NO" in S601), that is, when the CHP 119 has received a read request for a virtual storage area to which a logical storage area has not been allocated, all or a portion of the data patterns written in the DPT 800 (for example, only the data pattern corresponding to the virtual LDEV 61*c* specified by the read request) are read, and the read data patterns are sent to the host terminal 200C (S610).

Thus according to the first specific example described above, the channel control portion 110C, on receiving a write request from the host terminal 200C, performs a comparison to determine whether the data pattern of the host data contained in the write request conforms to any of the one or a plurality of data patterns (data patterns for write-excluded data) registered in advance, and if the comparison result is positive, erases the host data without storing it in the LDEV. Also, the channel control portion 110C, upon receiving a read request from the host terminal 200C, performs a comparison to determine whether the data pattern of the data read from the LDEV (data to be transferred to the host terminal 200C) conforms to any of the one or a plurality of data patterns (data patterns for write-excluded data) registered in advance, and if the comparison result is positive, erases the read data from the LDEV. By this means, more numerous empty storage areas can be created in the LDEV.

(2) Second Specific Example of this Aspect

Figure 14:
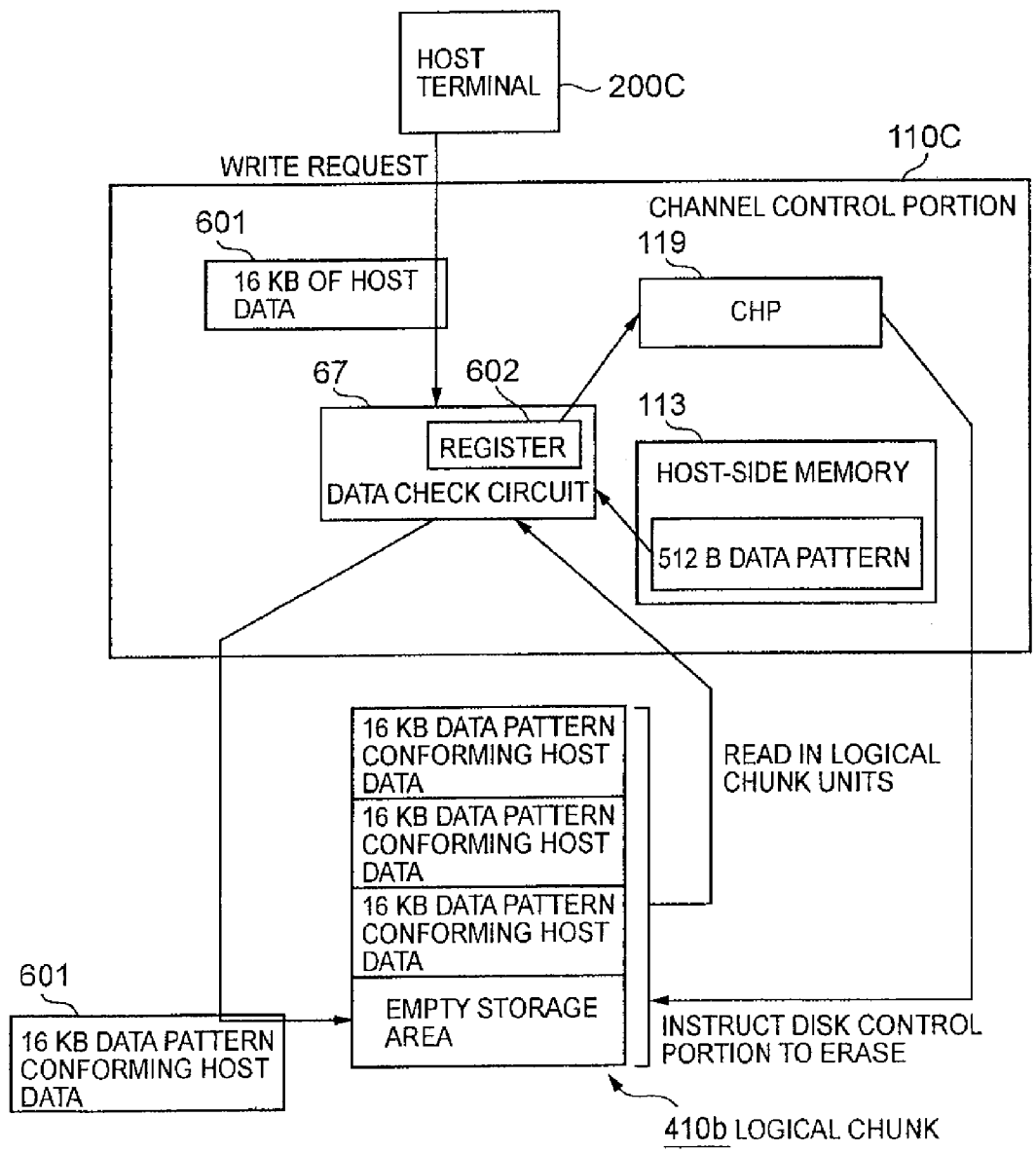
FIG. 14 is a drawing used to explain a second specific example of this aspect.
Figure 15:
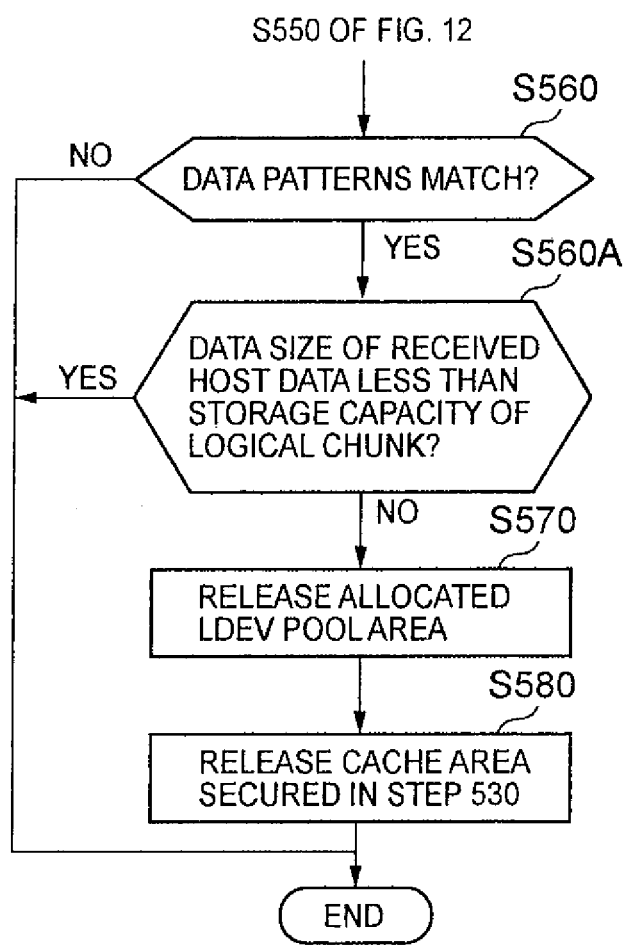
FIG. 15 shows the flow of processing when a write request is received from the host terminal 200C, in the second specific example of this aspect.

FIG. 14 is a drawing used to explain a second specific example of this aspect. FIG. 15 shows the flow of processing when a write request is received from the host terminal 200C, in this second specific example. Below, these drawings are used to explain the second specific example.

For example, the units for allocating storage area in a disk storage device 300 are the logical chunks constituting an LDEV. If there are N bytes in one block of an LDEV (where N is a natural number), then the storage capacity of a logical chunk (and virtual chunk) is M×N bytes (where M is a natural number). For example, if N=512 and M=128, then the storage capacity of a logical chunk is 64 kilobytes (kB).

In this second specific example, the data size of host data received from the host is taken to be a divisor of the storage capacity of a logical chunk (that is, less than the storage capacity), such as for example one-fourth of the storage capacity of a logical chunk. Specifically, if the storage capacity of a logical chunk 410*b* is 64 kB, suppose that 16 kB of host data 610 is received. Suppose further that the data size of the data pattern of write-excluded data registered in the DPT 800 is less than the storage capacity of a logical chunk, such as for example 512 bytes.

In this case also, the data check circuit 67 of the channel control portion 110C performs the processing of S510 to S550 in FIG. 12, and compares the 16 kB of host data 610 with the 512 B write-excluded data pattern. In this case, the data size of the host data 610 is less than the storage capacity of a logical chunk, but if all of the 512 B portions that configure the data 601 conform to the write-excluded data pattern, then a positive result is written to the register 602 of the data check circuit 67 as the data pattern comparison result.

The CHP 119, upon referencing the register 602 and obtaining a positive comparison result (that is, indicating that the host data 610 conforms to the write-excluded data pattern) ("YES" in S560 of FIG. 15), judges whether the data size of the received host data 610 is less than the storage capacity of a logical chunk (S560A).

If a positive result is obtained as the result of the judgment of S560A ("YES" in S560A), the CHP 119 ends the flow of processing; if on the other hand a negative judgment result is obtained ("NO" in S560A), the processing of S570 to S580 is performed.

In this way, when the data size of the host data is smaller than the storage capacity of a logical chunk, even if the data pattern comparison result is positive, writing to the logical chunk 410*b* is performed. When this is repeated, as a result of writing of host data until the logical chunk 410*b* is filled, a collection of host data having a constant data pattern will exist in the entirety of the logical chunk 410*b*. Specifically, when for example four write requests are received each having a 16-kB host data portion, all of the host data (that is, host data conforming to the data pattern) is written to the logical chunk 410*b*, and the logical chunk 410*b* having a storage capacity of 64 kB is filled with the four 16-kB portions of host data.

When as shown in FIG. 14 host data is read from a LDEV, the host data is read in logical chunk units. Consequently as explained above, when a plurality of data pattern-conforming host data portions exist in a single logical chunk, a data group comprising a plurality of data pattern-conforming host data portions is read as a single host data portion.

The data check circuit 67 performs a data pattern comparison for read host data as well, and writes the comparison result to the register 602. When the CHP 119 obtains a positive data pattern comparison result from the register 602 for the host data read from the logical chunk 410*b*, the host data in the logical chunk 410*b* is erased and the logical chunk 410*b* is set as an empty logical chunk 410*b*. By this means, the logical chunk 410*b* existing in the LDEV pool 68 becomes an empty logical chunk 410*b*, and dynamic association with a virtual chunk 410*c* becomes possible.

Occasions for reading host data in logical chunk units include, for example, when a read request is received from the host terminal 200C, when a snapshot is created in a logical chunk specified by a write request from the host terminal 200C, and when parity data is generated using host data in a logical chunk.

By means of this second specific example, host data existing in a logical chunk can be eliminated even when the data pattern thereof is constant.

(3) Third Specific Example of this Aspect

In a third specific example, the data check circuit 67 is in the disk control portion.

Figure 16:
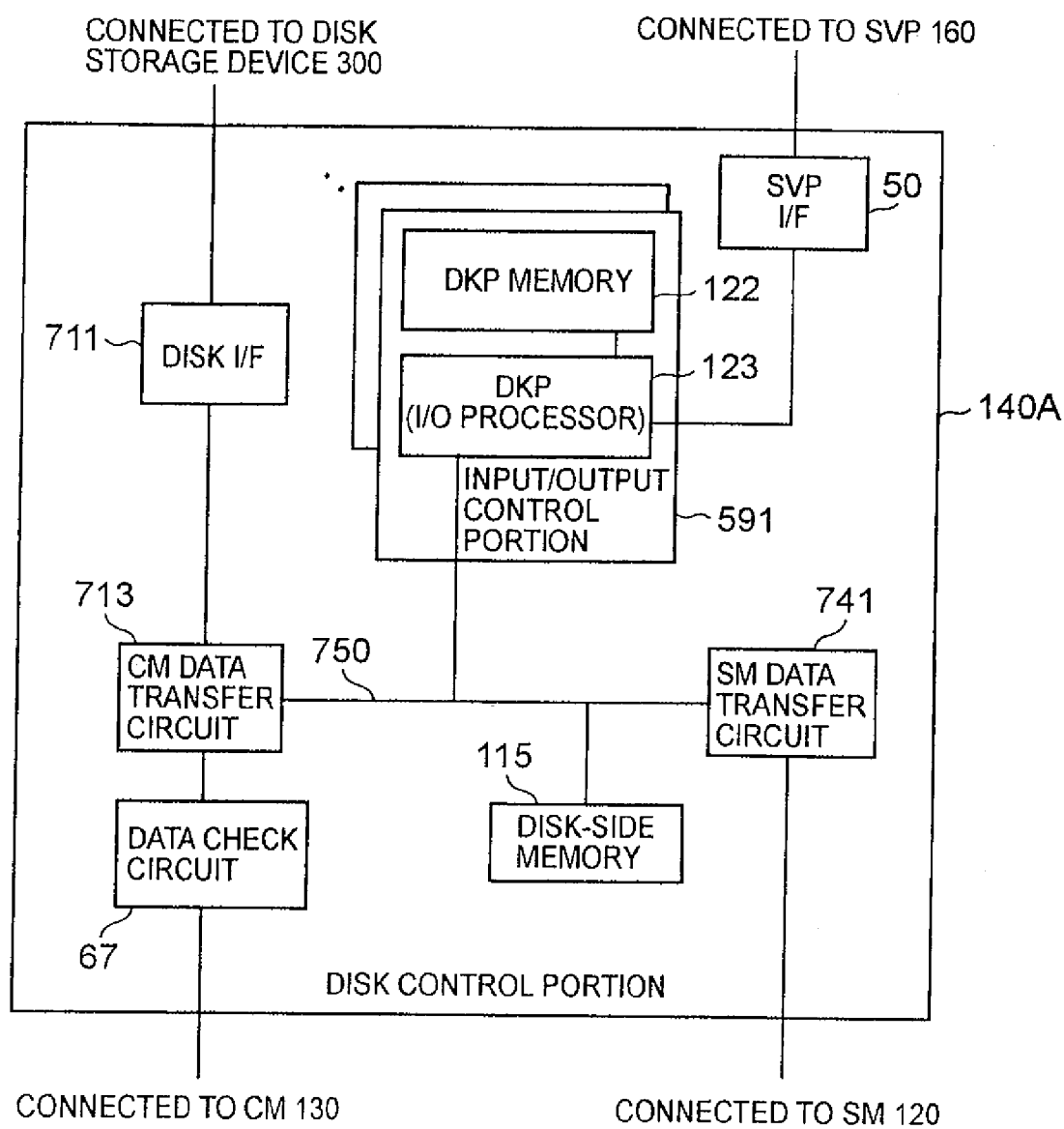
FIG. 16 shows an example of the configuration of a disk control portion 140A in a third specific example of this aspect.

FIG. 16 shows an example of the configuration of a disk control portion 140A in the third specific example. The disk control portions 140A to 140D all have effectively the same configuration, and so the disk control portion 140A is explained as a representative example.

The disk control portion 140A is formed as an integrated board (for example, a disk adapter). This disk control portion 140A comprises a connector for board connection, not shown; by mating this board connection connector with a prescribed connector of the storage control device 100, the disk control portion 140A is electrically connected to the storage control device 100. In the disk control portion 140A are installed a disk interface portion (hereafter abbreviated to "disk I/F") 141, disk-side memory 115, one or a plurality of input/output control portions 591, SVP interface portion (hereafter "SVP I/F") 50, CM data transfer circuit 713, and SM data transfer circuit 741.

The disk I/F 711 is a communication interface for communication with the disk storage device 300, and is for example connected to the disk storage device 300 via a SAN or other communication network.

Each of the one or a plurality of input/output control portions 591 controls processing performed based on I/O requests received from the host terminals 200A to 200D, and are for example microprocessor units. The input/output control portions 591 comprise, for example, a DKP 123 and DKP memory 122.

The DKP 123 is for example a microprocessor, and governs control of the entire disk control portion 140 as well as controlling communication between the channel control portions 110A to 110D, disk storage device 300, and SVP 160. The DKP 123 realizes the functions of the disk control portion 140A by executing various computer programs stored in the DKP memory 122 (or the disk-side memory 115). Functions realized by the disk control portion 140A are, for example control of data storage to and reading from a disk storage device 300 based on the RAID level, and control of the copying, backup, and other processing of data stored in a disk storage device 300.

The DKP memory 122 is volatile or non-volatile memory (for example, NVRAM (Non-Voltatile RAM)), and for example stores a computer program which governs control of the DKP 123. The contents of the program stored in the DKP memory 122 can be written and overwritten through, for example, instructions from the SVP 160 or the NAS manager 806, explained below.

The SVP I/F 50 is connected via an internal LAN 150 or other communication network to the SVP 160, and is also connected to the DKP 123. The SVP I/F 50 is a communication interface (for example, a LAN controller) to control communication between the SVP 160 and the DKP 123.

The CM data transfer circuit 713 receives user data from the CM 130 and transfers the data to the disk-side memory 115, and transfers user data obtained from a disk storage device 300 to the CM 713, under the control of the DKP 123.

The SM data transfer circuit 741 transfers to the SM 123 control information (for example, messages between processors) from the DKP 123 to the CHP (channel processor), and transfers control information received from the SM 120 to the DKP 123, under the control of the DKP 123.

The disk-side memory 115 is volatile or non-volatile memory, which for example temporarily stores user data, or stores one or a plurality of write-excluded data patterns read by the DKP 123.

In this third specific example, the above-described data check circuit 67 is provided between the CM 130 and the CM data transfer circuit 713, but may instead be provided in another location on the disk control portion 140A.

In this third specific example, the DKP 123 performs processing similar to that of the CHP 119 in processing based on the result of comparison of the data pattern of host data with write-excluded data patterns.

For example, the data check circuit 67 performs a comparison to determine whether the data pattern of the host data output to a disk storage device 300 (or read from a disk storage device 300) conforms to a write-excluded data pattern registered in the disk-side memory 115, and writes the comparison result to a register, not shown. The DKP 123, upon obtaining a positive data pattern comparison result from the register, erases the host data.

When, as in this third specific example, the data check circuit 67 is installed in the disk control portion 140A, the following processing can also be executed.

(A) Case in which a Correction Read is Performed

A collection read is the reading of data from a plurality of logical chunks in a plurality of other disk storage devices 300 of the same RAID group 2, when a disk storage device 300 for which there is a single disk control portion cannot be accessed. In this case, the disk control portion 140A can take the exclusive OR of a plurality of data portions read from a plurality of logical chunks, to restore data. In this correction read, when data is read from a logical chunk, processing to release the logical storage area of the LDEV pool is executed.

In this third specific example, data pattern comparisons, and processing based on the comparison results, is performed in the disk control portions 140A to 140D.

(B) Case in which Drive Copying is Performed

In drive copying, when a malfunction in a single disk storage device 300 is anticipated, the data in the disk storage device 300 is copied to a spare disk storage device 300. In this case, the disk control portion 140A reads the data in the logical chunks 410b on the disk storage device 300 malfunctioning of which is anticipated; in this case, processing is executed to release the logical storage areas in the LDEV pool 68.

(4) Fourth Specific Example of this Aspect

The fourth specific example is an example for the case in which normal LUs and virtual LUs coexist.

Figure 17:
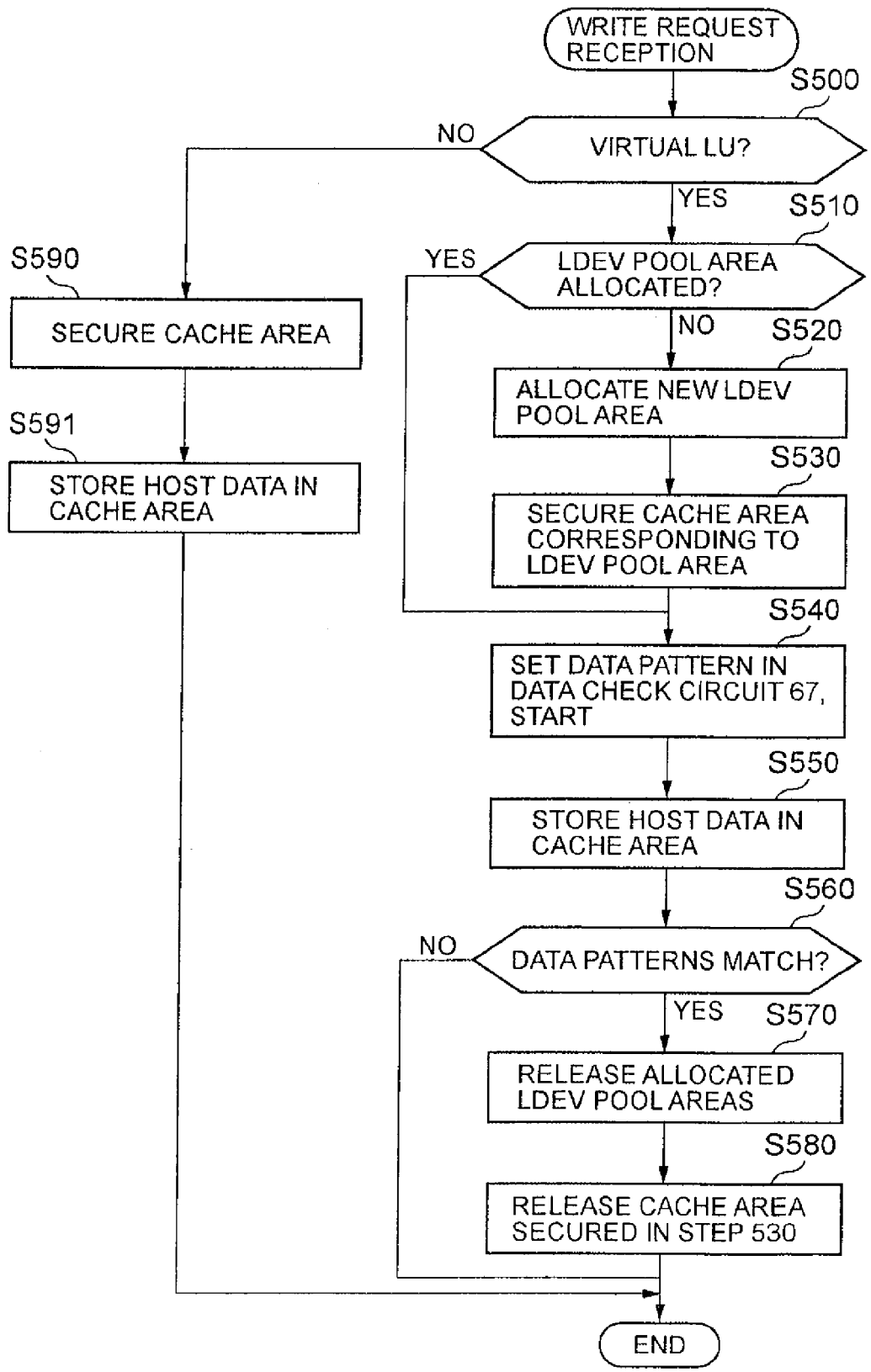
FIG. 17 shows the flow of processing of a channel control portion 110C when a write request is received from the host terminal 110C, in a fourth specific example of this aspect.

FIG. 17 shows the flow of processing of a channel control portion 110C when a write request is received from the host terminal 110C, in this fourth specific example.

The channel control portion 110C judges whether the write request received from the host terminal 200C is a request to write to a virtual LU 310C (S500).

If the judgment result of S500 is positive ("YES" in S500), the channel control portion 110C executes the processing S510 to S580, explained above referring to FIG. 12.

If on the other hand the judgment result of S500 is negative ("NO" in S500), that is, if it is judged that the write request is for a normal LU, then the CHP 119 of the channel control portion 110C secures a cache area in the CM 130 sufficient to store the host data (S590). Then, the CHP 119 stores the host data in the secured cache area (S591).

Figure 18:
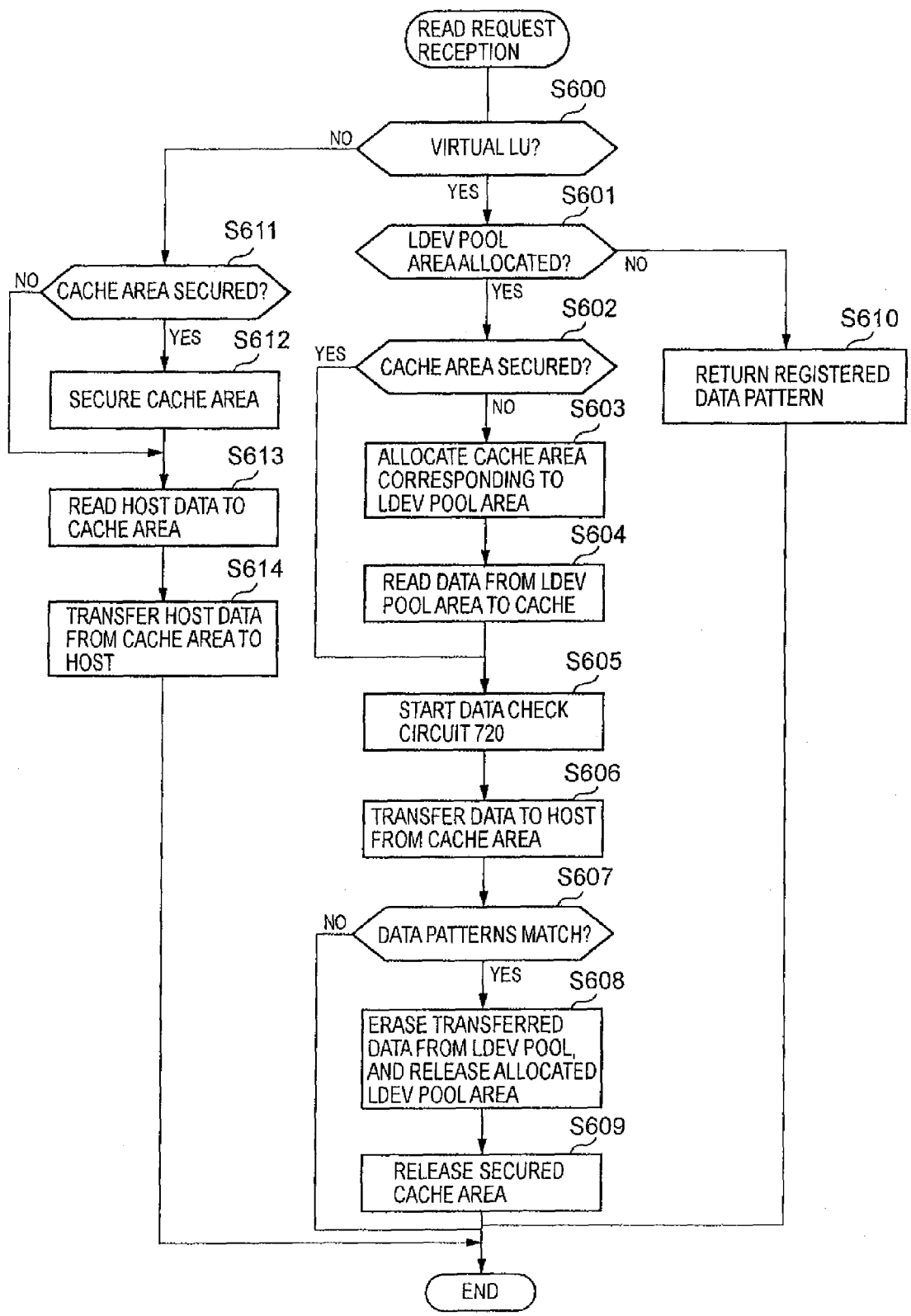
FIG. 18 shows the flow of processing of a channel control portion 110C when a read request is received from the host terminal 110C, in a fourth specific example of this aspect.

FIG. 18 shows the flow of processing of the channel control portion 110C when a read request is received from the host terminal 110C, in this fourth specific example.

The channel control portion 110C judges whether the read request received from the host terminal 200C is a read request for a virtual LU 310C (S600).

If the judgment result of S600 is positive ("YES" in S600), then the channel control portion 110C executes the processing S601 to S610 explained above referring to FIG. 13.

If on the other hand the judgment result of S600 is negative ("NO" in S600), that is, if it is judged that the read request is for a normal LU, then the CHP 119 of the channel control portion 110C judges whether a cache area sufficient to store the host data has been secured on the CM 130 (S611). If the cache area has been secured ("YES" in S611), the CHP 119 commands the storage control portion to store the host data in the cache area (S613); if on the other hand a cache area has not been secured ("NO" in S611), the cache area is secured (S612), and S613 is executed. Then, the CHP 119 transfers the host data from the cache area to the host terminal 200C (S614).

By means of this fourth specific example, processing is executed according to whether an I/O request is issued to a normal LU or to a virtual LU.

(5) Fifth Specific Example of this Aspect

Figure 19:
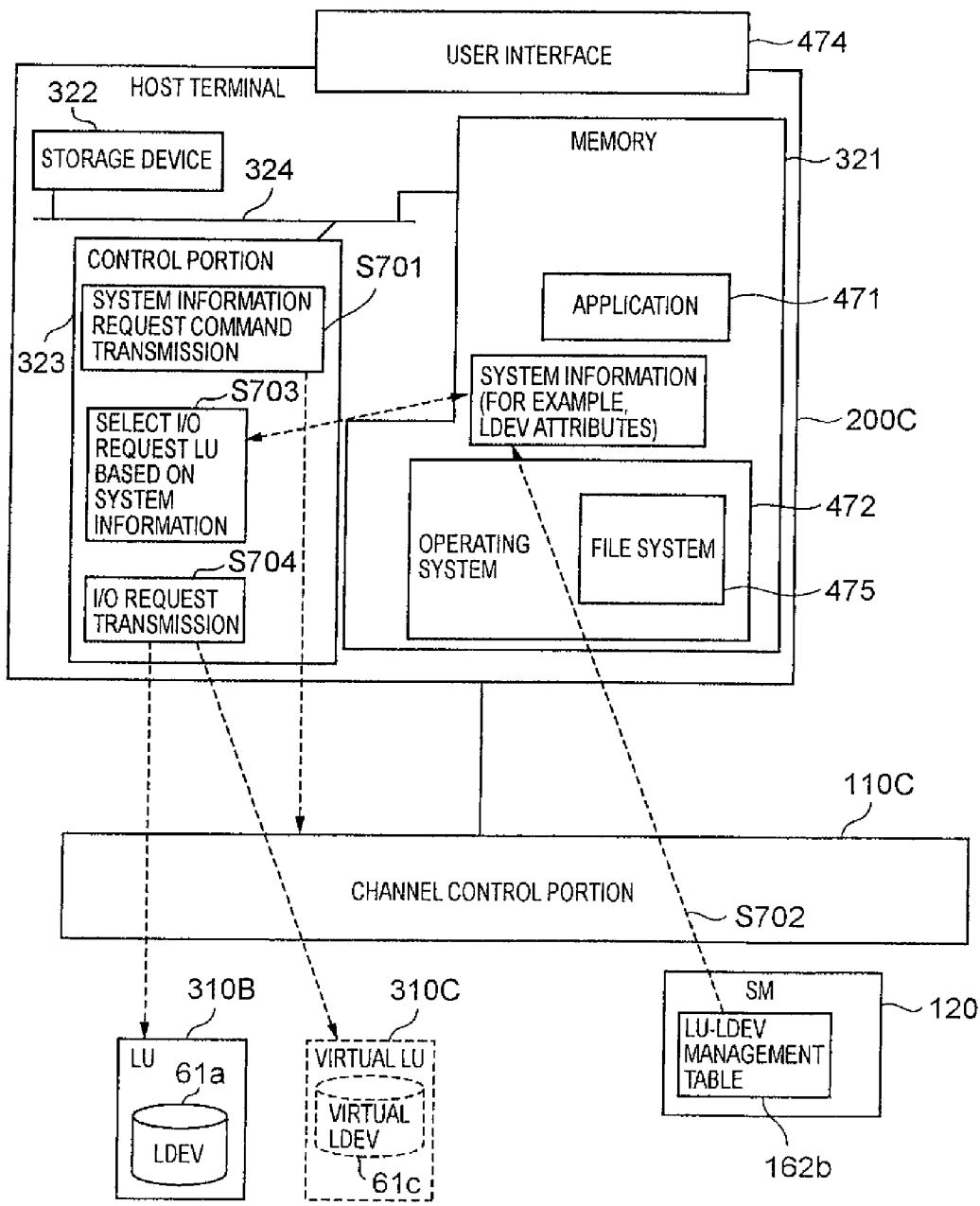
FIG. 19 shows the configuration and flow of processing of a fifth specific example of this aspect.

FIG. 19 shows the configuration and flow of processing of a fifth specific example.

In this fifth specific example, the control portion 323 (OS 472) of the host terminal 200C transmits a system information request command (S701). This system information request command is, for example, an Inquiry command or device discovery command conforming to the SCSI protocol. When for example the power supply of the host terminal 200C is turned on, the control portion 323, or when the OS 472 is restarted, an Inquiry command is transmitted. Also, when for example the power supply of the host terminal 200C is turned on or a prescribed instruction is received from the user via the user interface 474, the control portion 323 transmits a device discovery command.

The channel control portion 110C, on receiving a system information request command, acquires the system information from the LU-LDEV management table 162b registered in the SM 120, and transmits the system information to the host terminal 200C. The system information transmitted to the host terminal 200C is registered in the memory 321 of the host terminal 200C. The system information is for example information associated with each LUN, and comprises, at least, the LDEV attributes associated with LUNs.

When transmitting an I/O request to the channel control portion 110C, the control portion 323 selects either a normal LU 310S or a virtual LU 310C to which to issue the I/O request, based on the LDEV attributes comprised in the system information registered in memory 321 (S703).

Specifically, the control portion 323 may for example display the attributes of a plurality of LUs which can be accessed by the host terminal 200C, based on the LDEV attributes registered in memory 321, prompt the user to select an LU to which to issue the I/O request, and select the LU selected by the user as the LU to which to issue the I/O request. Or, the control portion 323 may for example reference the host data attributes (for example, meta data of the host data) stored in the memory 321 or similar, ascertain the data attributes of the host data for writing or for reading, and based on these data attributes and the LDEV attribute, automatically select whether to issue the I/O request to a normal LU 310S or to a virtual LU 310C. More specifically, in the case of host data for which high reliability is required, the control portion 323 selects the normal LU 310S, and in the case of host data for which when high-speed data access is required, the virtual LU 310C is selected.

The control portion 323 then transmits the I/O request to the LU selected in S703 (S704).

By means of this fifth specific example, the host terminal 200C can identify which are normal LUs and which are virtual LUs, and can select a normal LU or a virtual LU.

(6) Sixth Specific Example of this Aspect

Figure 20:
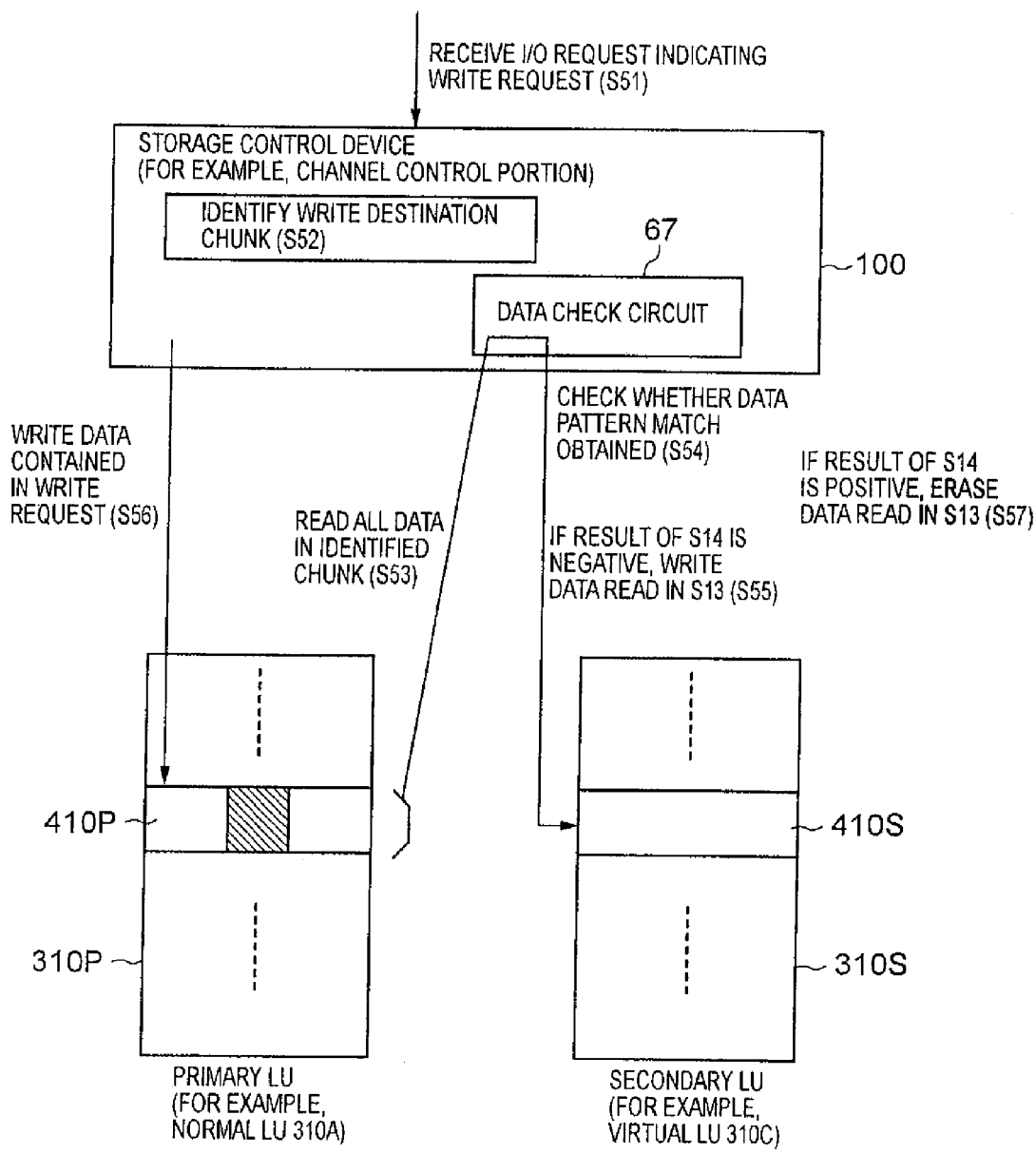
FIG. 20 shows the configuration and flow of processing of a sixth specific example of this aspect; and, FIG. 21 shows the specific flow of processing of the sixth specific example of this aspect.

FIG. 20 shows the configuration and flow of processing of a sixth specific example of this aspect.

The storage control device 100 forms an LU pair from two LUs, with one LU as the primary LU 310P, and the other LU as the secondary LU 310S, and executes snapshots in which the data within the primary LU 310P is copied to the secondary LU 310S.

Specifically, the storage control device 100 sets a normal LU 310A as the primary LU 310P and a virtual LU 310C as the secondary LU 310S to form an LU pair, either manually upon receiving a request from an external terminal (for example the SVP 160), or automatically upon receiving an I/O request indicating a write request (S51).

Then, the storage control device 100 identifies the write destination chunk (for example, leading LBA) 410P in the normal LU 310A from the received write request (S52). And, the storage control device 100 reads all the data in the identified chunk 410P, even if only a portion of the data within the identified chunk 410P (the portion indicated by shading) is updated (S53).

At this time, the data check circuit 67 within the storage control device 100 performs a comparison to determine whether the data conforms to the write-excluded data pattern (S54).

If a negative comparison result is obtained, the storage control device 100 writes the data to the virtual LU 310C (S55). Specifically, the storage control device 100 dynamically associates the virtual chunk 410S within the virtual LU 310C with a logical chunk within the LDEV pool 68, as explained above, and writes the data to the LDEV chunk associated with the virtual chunk 410S.

After creating a snapshot in this way, the storage control device 100 writes the data contained in the write request received in S51 to the above identified chunk 410P (S56).

On the other hand, when as the comparison result of S54 a negative comparison result is obtained, the storage control device 100 erases the data read in S53 (S57).

In the above flow of processing, when the storage control device 100 attempts to form a LU pair, a LU pair is formed only when the LU-LDEV management table 162b is referenced and the storage capacities of the primary LU 310P and secondary LU 310S coincide; if the storage capacities do not coincide, the storage control device 100 may refuse to form a LU pair.

When a configuration is adopted in which an LU pair is not formed if the storage capacities of the primary LU 310P and the secondary LU 310S are not the same, if the storage capacity of the primary LU 310P is large, the storage capacity of the secondary LU 310S must also be large. However, in snapshot creation the size of the data copied from the primary LU 310P to the secondary LU 310S may be smaller than the capacity of the primary LU 310P. If, despite this, the large-capacity normal LU 310A is employed as a secondary LU 310S, a large amount of idle empty storage capacity may occur.

However, in creation of a snapshot as described above, by forming a LU pair with a virtual LU 310C as the secondary LU 310S, the empty area of the LDEV pool 68 which can be associated with the virtual LU 310C is dynamically associated with another virtual LU 310C, so that the occurrence of idle empty storage areas can be prevented.

Figure 21:
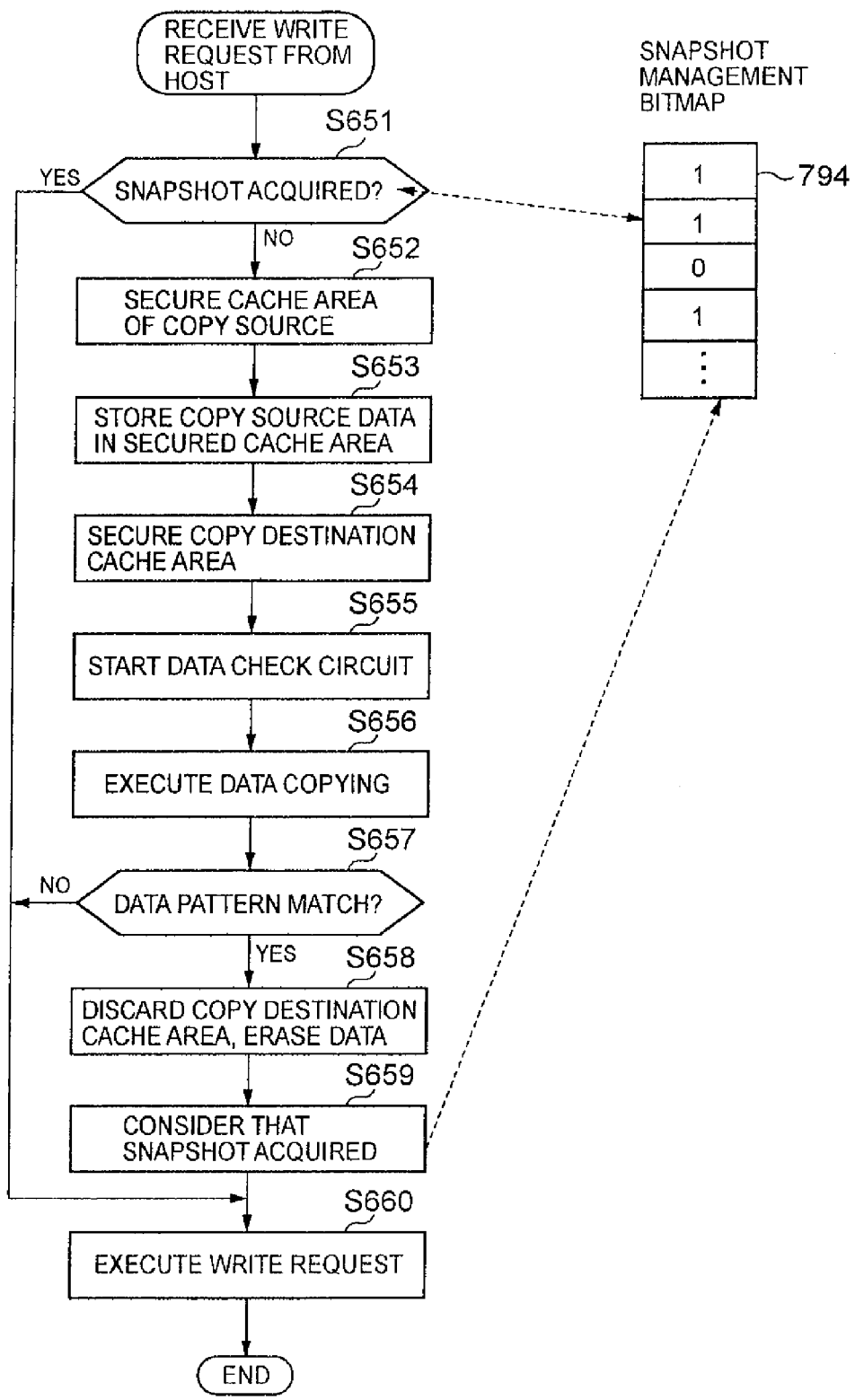

FIG. 21 shows the specific flow of processing of the sixth specific example of this aspect.

For example, a snapshot management bitmap 794 is registered for each LU (or for each LDEV) in memory (for example SM 120) in the storage control subsystem 102. Information (for example, "1" or "0") indicating whether a snapshot has been taken is registered in the snapshot management bitmap 794 for each chunk of the corresponding LU (or LDEV).

Upon receiving a write request, the CHP 119 of the channel control portion 110C references the snapshot management bitmap 794 corresponding to the primary LU 310P for the write request, and judges whether a snapshot has been created for the logical chunk to which data will be written (S651).

If as the result of S651a snapshot is judged to have been created ("YES" in S651), the CHP 119 stores the host data contained in the write request in the logical chunk 410P of the primary LU 310P (S660).

On the other hand, if as the result of S651 a snapshot is judged not to have been created ("NO" in S651), the CHP 119 secures a cache area for the copy source (for example the logical chunk 410P), and stores the data of the copy source in the cache area (S653).

Then, the CHP 119 secures a cache area for the copy destination (for example the virtual chunk 410S) (S654), and also starts the data check circuit 67 and stores the data in the cache area at the copy destination (S656).

At this time, the data check circuit 67 performs a comparison to determine whether the data pattern of the data from the copy source stored in the copy destination conforms to a write-excluded data pattern (S657).

If a negative comparison result is obtained ("NO" in S657), the CHP 119 executes the above processing of S660.

If on the other hand a positive comparison result is obtained ("YES" in S657), the CHP 119 discards the cache area secured for the copy destination, and erases the data stored in the copy destination (S658). Also, the CHP 119 accesses the snapshot management bitmap 794 and updates the information corresponding to the copy source to indicate a snapshot has been taken (S659).

In the above, aspects of this invention have been explained, but these are only examples used to explain the invention, and the scope of this invention is not limited to these aspects. This invention can be implemented with various modifications. For example, in the above explanation, the data pattern comparison by the data check circuit 67 is performed only for data stored in the virtual LU 310C (virtual LDEV 61c), but data pattern comparison may also be performed for data stored in the normal LUs 310A, 3108 (normal LDEV 61a) (that is, when the comparison produces a positive result, processing may be performed such that the data is not stored in a normal LDEV or is erased after storing). Also, after formation of a pair of virtual LUs, snapshot creation may be performed (that is, data copying may be performed between logical chunks in one or a plurality of LDEV pools 68). Also, a virtual LU may for example be made a primary LU, and a normal LU may be made a secondary LU.

What is claimed is:

1. A storage system comprising:
    a plurality of storage devices; and
    a controller managing a primary logical unit a secondary logical unit, and a storage pool including a plurality of storage chunks in said plurality of storage devices,
    wherein when said controller writes data to said secondary logical unit, said controller allocates at least one storage chunk of said plurality of storage chunks included in said storage pool to said secondary logical unit on a predetermined size basis if needed,
    wherein when said controller performs data migration from said primary logical unit to said secondary logical unit, said controller checks each of a plurality of data stored in said primary logical unit on said predetermined size basis to determine whether any of said plurality of data conforms to a specific data pattern, and does not migrate a first data which conforms to said specific data pattern to said secondary logical unit.

2. A storage system according to the claim 1, wherein said specific data pattern is all zero data.

3. A storage system according to the claim 1, wherein said controller does not allocate said storage chunk to said secondary logical unit to migrate said first data to said secondary logical unit from said primary logical unit.

4. A storage system according to the claim 1,
    wherein if a second data in said primary logical unit does not conform to said specific data pattern, said controller allocates said storage chunk in said plurality of storage devices to said secondary logical unit to migrate said second data to said secondary logical unit.

5. A storage system according to the claim 1, wherein a storage chunk in said plurality of storage devices is fully allocated to said primary logical unit when said controller starts to provide said primary logical unit to a computer.

6. A storage system according to the claim 1, wherein any storage chunk in said plurality of storage devices is not allocated to said secondary logical unit when said controller starts to provide said secondary logical unit to a computer.

7. A storage system comprising:
    a plurality of storage devices whose storage areas correspond to a plurality of storage chunks; and
    a controller managing a primary logical unit and a secondary logical unit including a plurality of logical chunks, and a storage pool including said plurality of storage chunks in said plurality of storage devices, wherein when said controller writes data to said secondary logical unit, said controller allocates at least one storage chunk included in said storage pool to said secondary logical unit on a predetermined size basis if at least one storage chunk is not allocated to at least one logical chunk of said secondary logical unit where data is to be written, and wherein when said controller performs data migration from said primary logical unit to said secondary logical unit, said controller checks each of a plurality of data stored in said primary logical unit on said predetermined size basis to determine whether any of said plurality of data conforms to a specific data pattern, and does not migrate a first data which conforms to said specific data pattern to said secondary logical unit.

8. A storage system according to the claim 7, wherein said specific data pattern is all zero data.

9. A storage system according to the claim 7, wherein said controller does not allocate said storage chunk to said plurality of logical chunks of said secondary logical unit to migrate said first data to said secondary logical unit from said primary logical unit.

10. A storage system according to the claim 7,
wherein if a second data in said primary logical unit does not conform to said specific data pattern, said controller allocates said storage chunk in said plurality of storage devices to said secondary logical unit to migrate said second data to said secondary logical unit.

11. A storage system according to the claim 7, wherein a storage chunk in said plurality of storage devices is fully allocated to said primary logical unit when said controller starts to provide said primary logical unit to a computer.

12. A storage system according to the claim 7, wherein any storage chunk in said plurality of storage devices is not allocated to said plurality of logical chunks of said secondary logical unit when said controller starts to provide said secondary logical unit to a computer.

13. A storage system comprising:
a plurality of storage devices; and
a controller managing a primary logical unit, a secondary logical unit and a storage pool including a plurality of storage chunks in said plurality of storage devices,
wherein when said controller writes data to said secondary logical unit, said controller allocates at least one storage chunk included in said storage pool to said secondary logical unit on a predetermined size basis if needed,
wherein when said controller performs data migration from said primary logical unit to said secondary logical unit, said controller checks a plurality of data stored in said primary logical unit to find a first data which conforms to a specific data pattern on a predetermined size basis in said plurality of data, and does not migrate said first data to said secondary logical unit.

14. A storage system according to the claim 13, wherein said specific data pattern is all zero data.

15. A storage system according to the claim 14, wherein said controller does not allocate a storage chunk to said secondary logical unit to migrate said first data to said secondary logical unit from said primary logical unit.

16. A storage system according to the claim 13,
wherein if a second data in said primary logical unit does not conform to said specific data pattern, said controller allocates said storage chunk in said plurality of storage devices to said secondary logical unit to migrate said second data to said secondary logical unit.

17. A storage system according to the claim 13, wherein a storage chunk in said plurality of storage devices is fully allocated to said primary logical unit when said controller starts to provide said primary logical unit to a computer.

18. A storage system according to the claim 13, wherein any storage chunk in said plurality of storage devices is not allocated to said secondary logical unit when said controller starts to provide said secondary virtual logical unit to a computer.

19. A control method for storage system including a plurality of storage devices and a controller, the control method comprising;
managing a primary logical unit, a secondary logical unit, and a storage pool including a plurality of storage chunks in said plurality of storage devices,
when data is written to said secondary logical unit, allocating at least one storage chunk included in said storage pool to said secondary logical unit on a predetermined size basis if needed;
checking each of a plurality of data stored in said primary logical unit on said predetermined size basis to determine whether any of said plurality of data conforms to a specific data pattern when said controller performs data migration from said primary logical unit to said secondary logical unit; and
not migrating a first data which conforms to said specific data pattern to said secondary logical unit.

20. A control method according to the claim 19, wherein said specific data pattern is all zero data.

21. A control method according to the claim 19, further comprising:
not allocating said storage chunk to said secondary logical unit to migrate said first data to said secondary logical unit from said primary logical unit.

22. A storage system according to the claim 19, further comprising:
allocating said storage chunk in said plurality of storage devices to said secondary logical unit to migrate a second data to said secondary logical unit, if said second data in said primary logical unit does not conform to said specific data pattern.

23. A control method according to the claim 19, wherein a storage chunk in said plurality of storage devices is fully allocated to said primary logical unit when said controller starts to provide said primary logical unit to a computer.

24. A control method according to the claim 19 wherein any storage chunk in said plurality of storage devices is not allocated to said secondary logical unit when said controller starts to provide said secondary logical unit to a computer.

\* \* \* \* \*